(12) United States Patent
Kim et al.

(10) Patent No.: US 10,574,515 B2
(45) Date of Patent: Feb. 25, 2020

(54) METHOD FOR CONFIGURING TRANSMISSION OPPORTUNITY SECTION IN WIRELESS ACCESS SYSTEM SUPPORTING UNLICENSED BAND, AND DEVICE FOR SUPPORTING SAME

(71) Applicant: LG ELECTRONICS INC., Seoul (KR)

(72) Inventors: Seonwook Kim, Seoul (KR); Seungmin Lee, Seoul (KR); Hakseong Kim, Seoul (KR); Byounghoon Kim, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 143 days.

(21) Appl. No.: 15/315,964

(22) PCT Filed: Jun. 5, 2015

(86) PCT No.: PCT/KR2015/005654
§ 371 (c)(1),
(2) Date: Dec. 2, 2016

(87) PCT Pub. No.: WO2015/186989
PCT Pub. Date: Dec. 10, 2015

(65) Prior Publication Data
US 2017/0111217 A1    Apr. 20, 2017

Related U.S. Application Data

(60) Provisional application No. 62/007,937, filed on Jun. 5, 2014, provisional application No. 62/105,753, filed on Jan. 21, 2015.

(51) Int. Cl.
*H04L 12/24*    (2006.01)
*H04L 5/00*    (2006.01)
(Continued)

(52) U.S. Cl.
CPC ............ *H04L 41/08* (2013.01); *H04L 5/001* (2013.01); *H04W 72/042* (2013.01);
(Continued)

(58) Field of Classification Search
CPC .................................................. H04W 72/0406
See application file for complete search history.

(56) References Cited

U.S. PATENT DOCUMENTS 8,031,587 B1 * 10/2011 Kang ................... H04J 11/0063
370/210
9,763,230 B2 * 9/2017 Lee ......................... H04L 5/001
(Continued)

FOREIGN PATENT DOCUMENTS

KR    10-2014-0010385 A    1/2014
KR    10-2014-0010450 A    1/2014
(Continued)

*Primary Examiner* — Zhiren Qin
(74) *Attorney, Agent, or Firm* — Birch, Stewart, Kolasch & Birch, LLP

(57) ABSTRACT

The present invention relates to a wireless access system supporting an unlicensed band, and provides a method for configuring a transmission opportunity (TxOP) section, and devices for supporting the same. The method for configuring a transmission opportunity (TxOP) section in a wireless access system supporting carrier aggregation (CA) with an unlicensed band, in one embodiment of the present invention, comprises the steps of: receiving, by a terminal, TxOP start information for indicating the start of the TxOP section; receiving orthogonal frequency division multiplexing (OFDM) symbol position information for indicating an OFDM symbol starting data transmission and reception in the TxOP section; and transmitting and receiving the data in a subframe (SF) of an S cell indicated by the TxOP start information on the basis of the OFDM symbol position information.

16 Claims, 18 Drawing Sheets

(51) Int. Cl.
*H04W 72/04* (2009.01)
*H04W 72/12* (2009.01)
*H04W 88/02* (2009.01)

(52) U.S. Cl.
CPC ......... *H04W 72/044* (2013.01); *H04W 72/12* (2013.01); *H04W 88/02* (2013.01)

(56) References Cited

U.S. PATENT DOCUMENTS

| | | | | |
|---|---|---|---|---|
| 2010/0254329 | A1* | 10/2010 | Pan | H04L 5/001 |
| | | | | 370/329 |
| 2012/0263127 | A1* | 10/2012 | Moon | H04L 5/001 |
| | | | | 370/329 |
| 2013/0083783 | A1 | 4/2013 | Gupta et al. | |
| 2013/0094442 | A1* | 4/2013 | Kim | H04W 72/0406 |
| | | | | 370/328 |
| 2013/0301597 | A1* | 11/2013 | Kim | H04L 5/0037 |
| | | | | 370/329 |
| 2014/0003387 | A1* | 1/2014 | Lee | H04L 5/001 |
| | | | | 370/330 |
| 2015/0296513 | A1* | 10/2015 | Nogami | H04W 28/18 |
| | | | | 370/329 |

FOREIGN PATENT DOCUMENTS

| | | |
|---|---|---|
| WO | WO 2012/078565 A1 | 6/2012 |
| WO | WO 2013/006988 A1 | 1/2013 |

* cited by examiner

FIG. 9
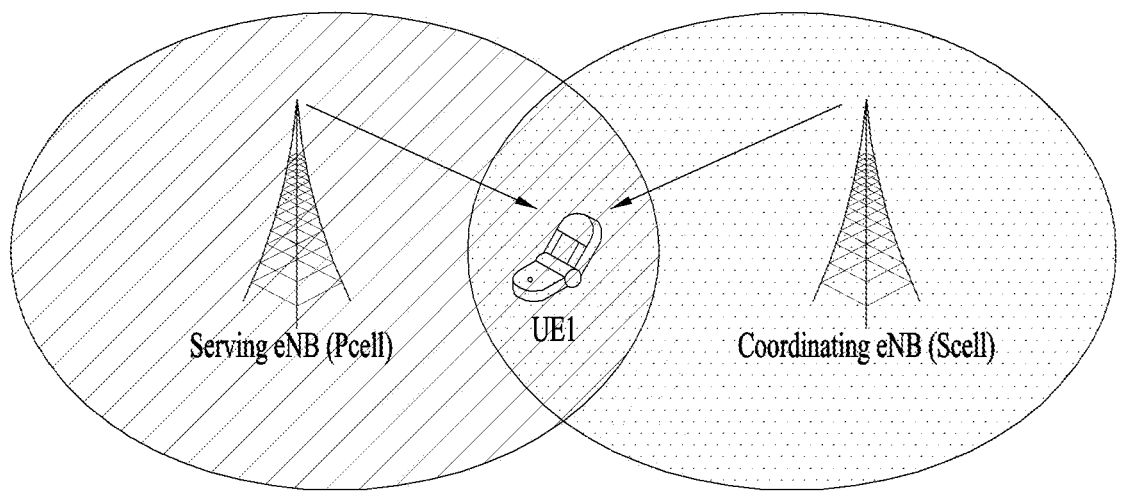
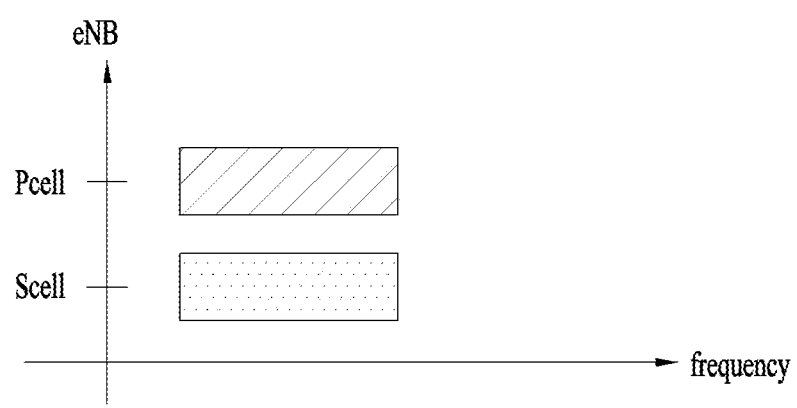

FIG. 15
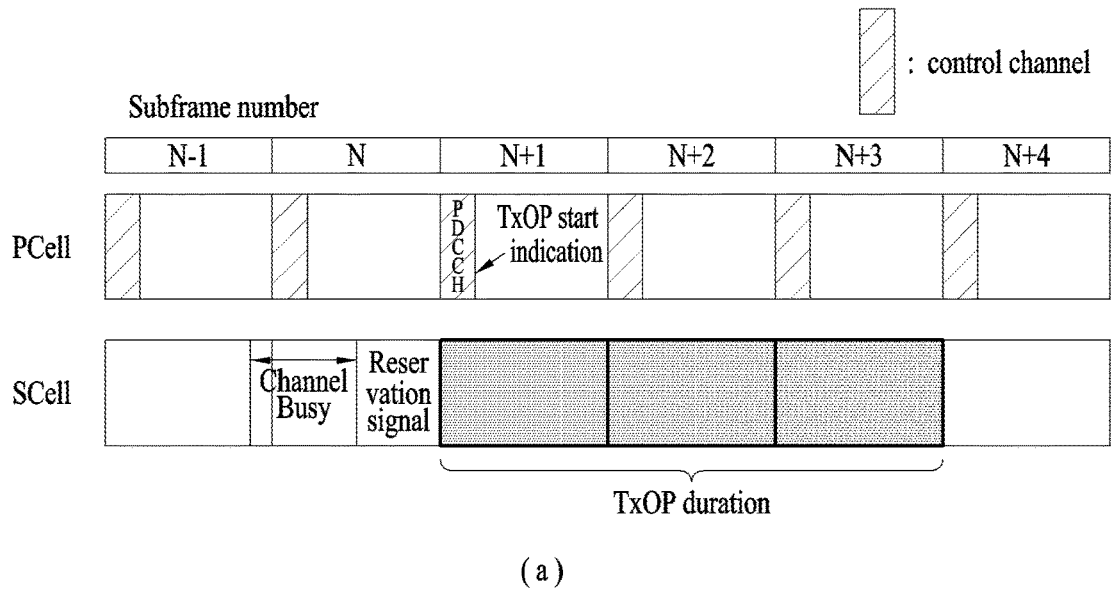
(a)
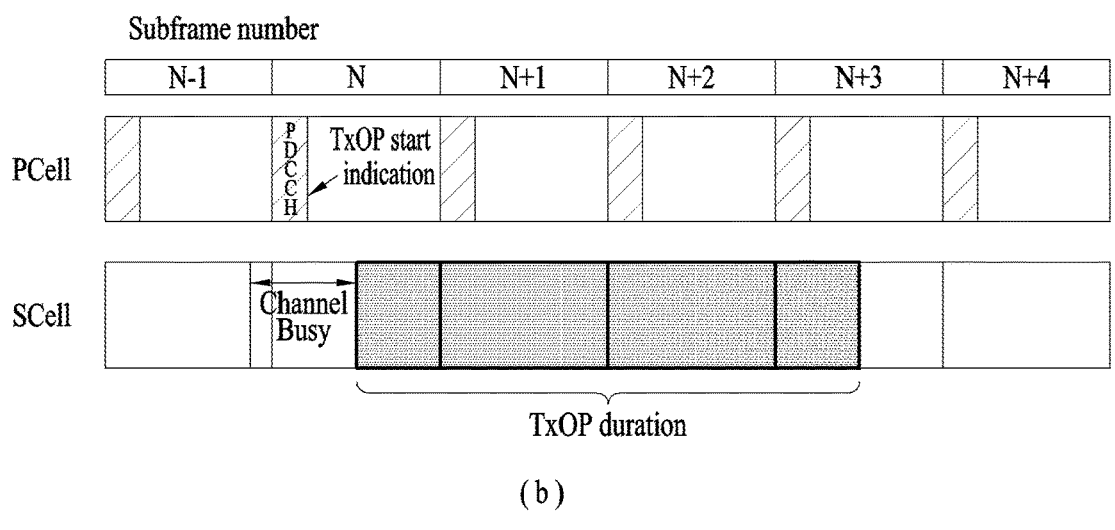
(b)
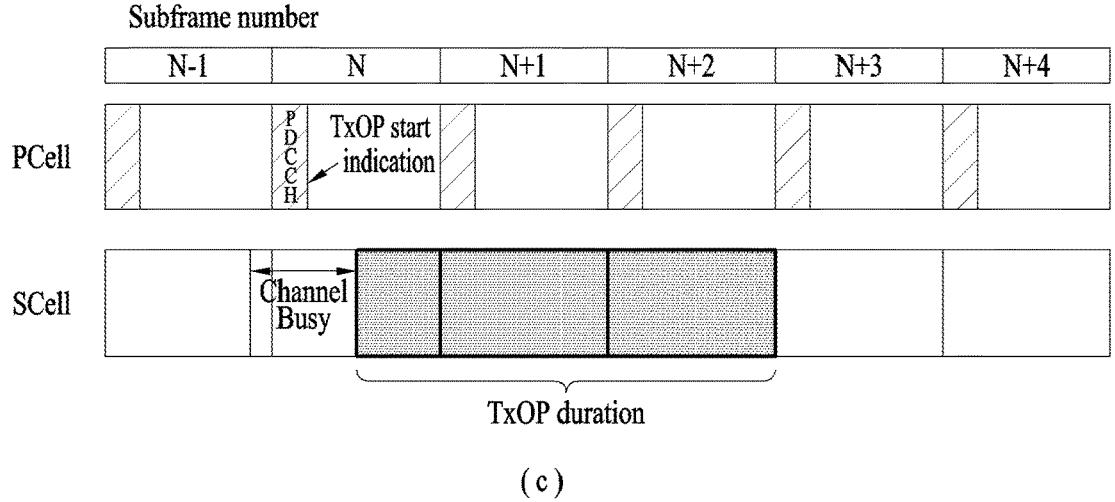
(c)

FIG. 16
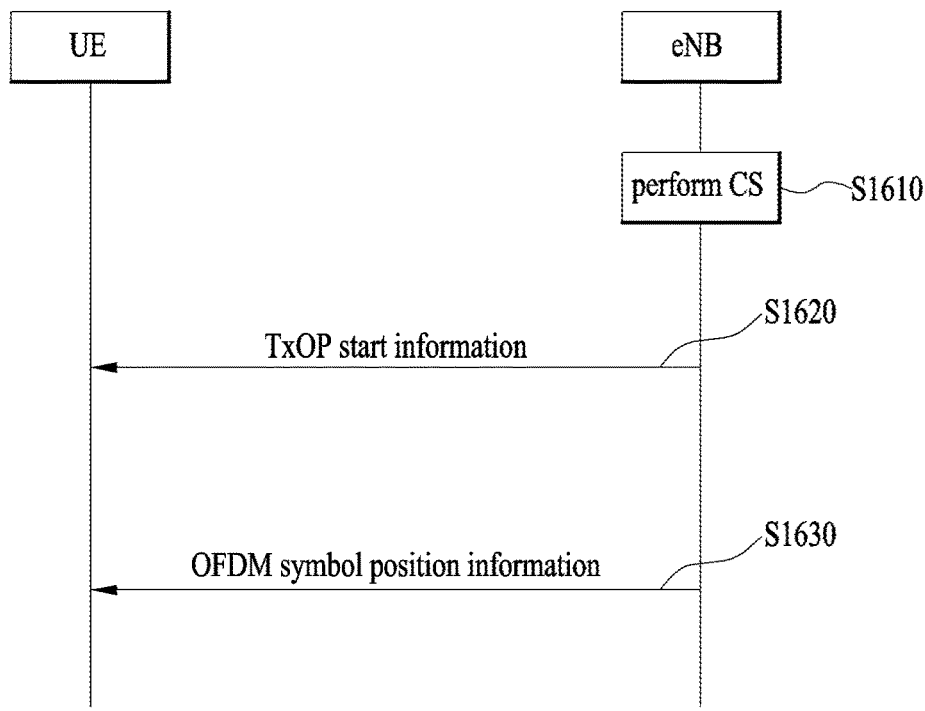
(a)
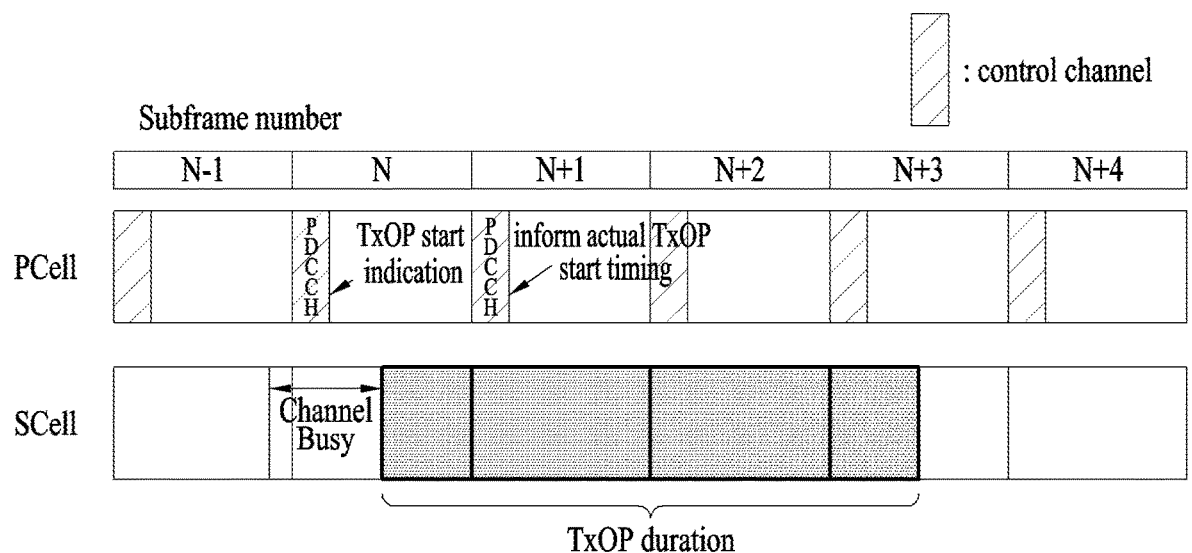
(b)

FIG. 19
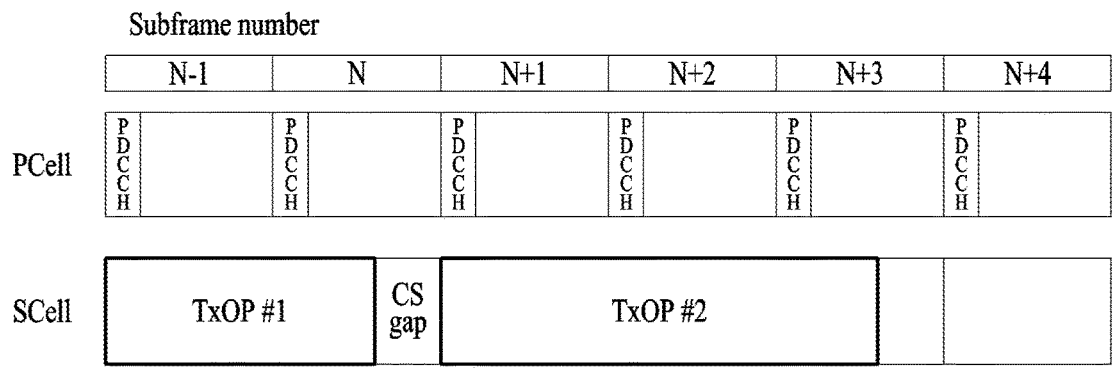
FIG. 20
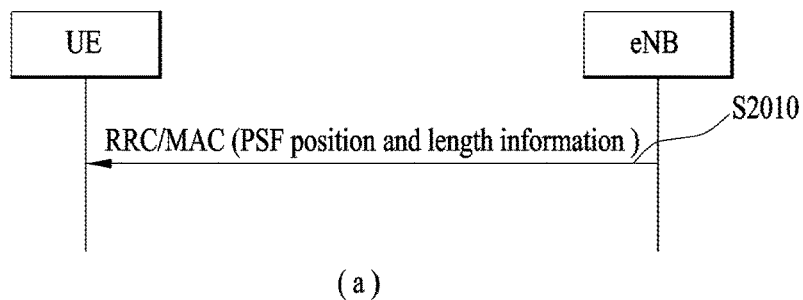
(a)
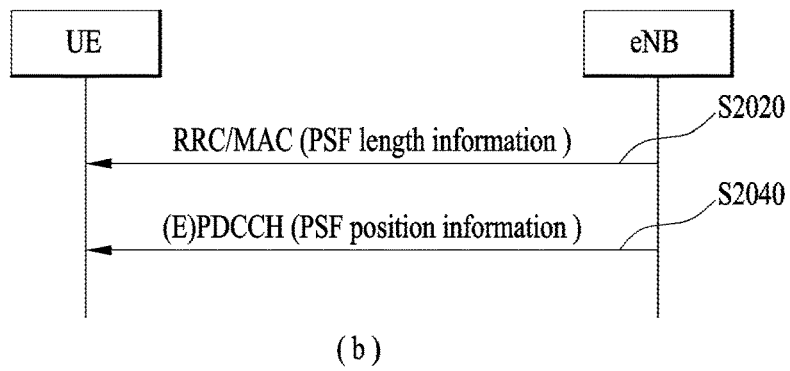
(b)
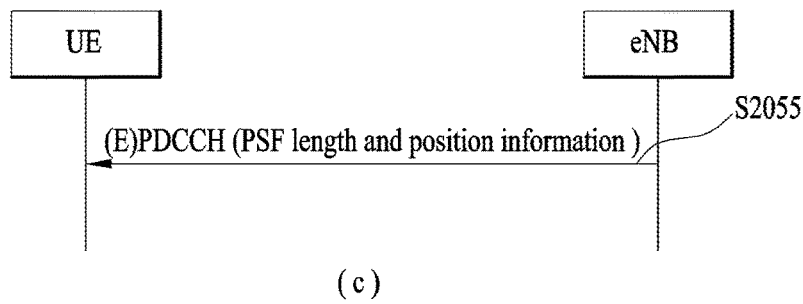
(c)

ated on Jun. 05, 2014 and 62/105,753 filed on Jan. 21, 2015, all of which are hereby expressly incorporated by reference into the present application.

TECHNICAL FIELD

The present invention relates to a wireless access system supporting an unlicensed band, and more particularly, to a method of configuring a transmission opportunity section and an apparatus supporting the method.

Background Art

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

Disclosure Of The Invention

Technical Tasks

The present invention relates to a wireless access system supporting an unlicensed band, and more particularly, to a method of configuring a transmission opportunity (TxOP) duration and apparatuses supporting the method.

An object of the present invention is to provide a method of efficiently transmitting and receiving data in a wireless access system supporting an unlicensed band and a licensed band.

Another object of the present invention is to provide various methods of defining and configuring a transmission opportunity (TxOP) duration on an unlicensed band.

The other object of the present invention is to provide apparatuses supporting the aforementioned methods.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

The present invention relates to a wireless access system supporting an unlicensed band, and more particularly, to a method of configuring a transmission opportunity (TxOP) duration and apparatuses supporting the method.

To achieve these and other advantages and in accordance with the purpose of the present invention, as embodied and broadly described, according to one embodiment, a method of configuring a transmission opportunity (TxOP) duration in a wireless access system supporting CA (carrier aggregation) with an unlicensed band includes the steps of receiving TxOP start information, which is received by a user equipment, for indicating the start of the TxOP duration, receiving OFDM symbol position information for indicating an OFDM (orthogonal frequency division multiplexing) symbol at which data transmission and reception start in the TxOP duration, and transmitting and receiving data based on the OFDM symbol position information in a subframe (SF) of a Scell indicated by the TxOP start information.

To further achieve these and other advantages and in accordance with the purpose of the present invention, according to a different embodiment, a user equipment for configuring a transmission opportunity (TxOP) duration in a wireless access system supporting CA (carrier aggregation) with an unlicensed band includes a transmitter, a receiver, and a processor configured to control the transmitter and the receiver to support a configuration of the TxOP duration. In this case, the processor can be configured to control the receiver to receive TxOP start information for indicating the start of the TxOP duration, configured to control the receiver to receive OFDM symbol position information for indicating an OFDM (orthogonal frequency division multiplexing) symbol at which data transmission and reception start in the TxOP duration, and configured to control the transmitter and the receiver to transmit and receive data based on the OFDM symbol position information in a subframe (SF) of a Scell indicated by the TxOP start information.

In the embodiments, the TxOP start information and the OFDM symbol position information are transmitted via a Pcell, the Pcell corresponds to a serving cell configured on a licensed band, and the Scell may correspond to a serving cell configured on the unlicensed band.

Or, the TxOP start information and the OFDM symbol position information are transmitted via the Scell and the Scell is scheduled by a self-carrier scheduling scheme and may correspond to a serving cell configured on the unlicensed band.

In the embodiments, the TxOP start information and the OFDM symbol position information can be transmitted through a different physical downlink control channel (PDCCH) or an enhanced physical downlink control channel (EPDCCH).

In this case, the TxOP start information or the OFDM symbol position information can be transmitted through a resource allocation field of a DCI format included in the PDCCH or the EPDCCH.

Or, the TxOP start information can be transmitted via a higher layer signal and the OFDM symbol position information can be transmitted via a physical downlink control channel (PDCCH) of an EPDCCH.

It is to be understood that both the foregoing general description and the following detailed description of the present invention are exemplary and explanatory and are intended to provide further explanation of the invention as claimed.

Advantageous Effects

As is apparent from the above description, the embodiments of the present invention have the following effects.

First, it is able to efficiently transmit and receive data in a wireless access system supporting an unlicensed band and a licensed band.

Second, a terminal is able to more efficiently utilize a TxOP duration by providing various methods for configuring the TxOP duration.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

DESCRIPTION OF DRAWINGS

The accompanying drawings, which are included to provide a further understanding of the invention, illustrate embodiments of the invention and together with the description serve to explain the principle of the invention.

FIG. 9 illustrates one of methods for transmitting SRS used in the embodiments of the present invention.

FIG. 15 is a diagram for one of methods of configuring a TxOP duration.

FIG. 16 is a flowchart for a different method of configuring a TxOP duration.

FIG. 19 is a diagram for explaining a method of sequentially configuring a TxOP duration.

FIG. 20 is a flowchart for explaining a method of transmitting and receiving control information for sequentially configuring a TxOP duration.

BEST MODE

Mode for Invention

Figure 1:
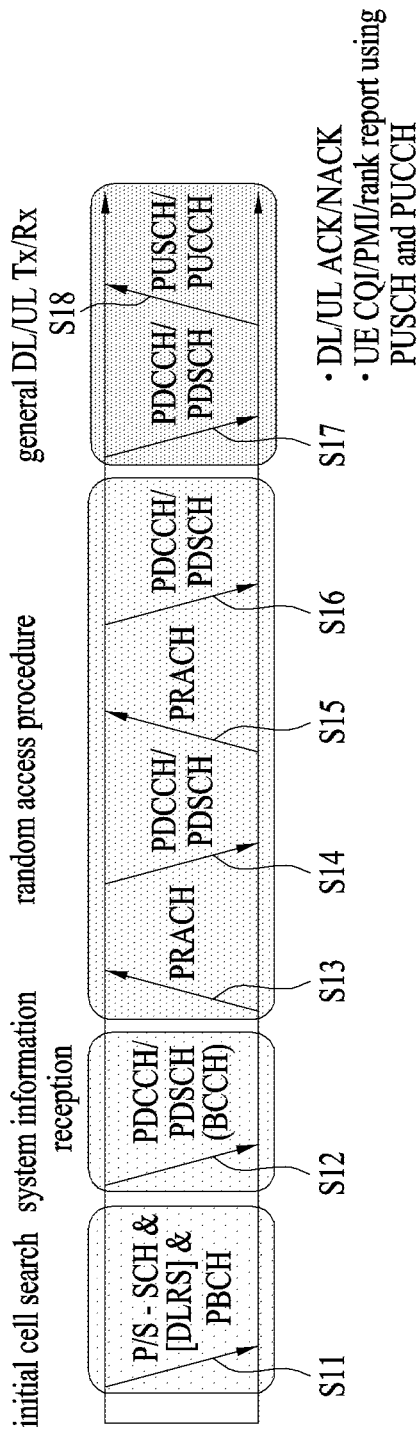
FIG. 1 is a conceptual diagram illustrating physical channels used in the embodiments and a signal transmission method using the physical channels.

Embodiments of the present invention explained in detail in the following relate to a wireless access system supporting an unlicensed band, more particularly, to a method of configuring a transmission opportunity duration and apparatuses supporting the same.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present invention (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term used in embodiments of the present disclosure, a data block is interchangeable with a transport block in the same meaning. In addition, the MCS/TBS index table used in the LTE/LTE-A system can be defined as a first table or a legacy table, and the MCS/TBS index table which is used for supporting the 256QAM can be defined as a second table or a new table.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1.3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
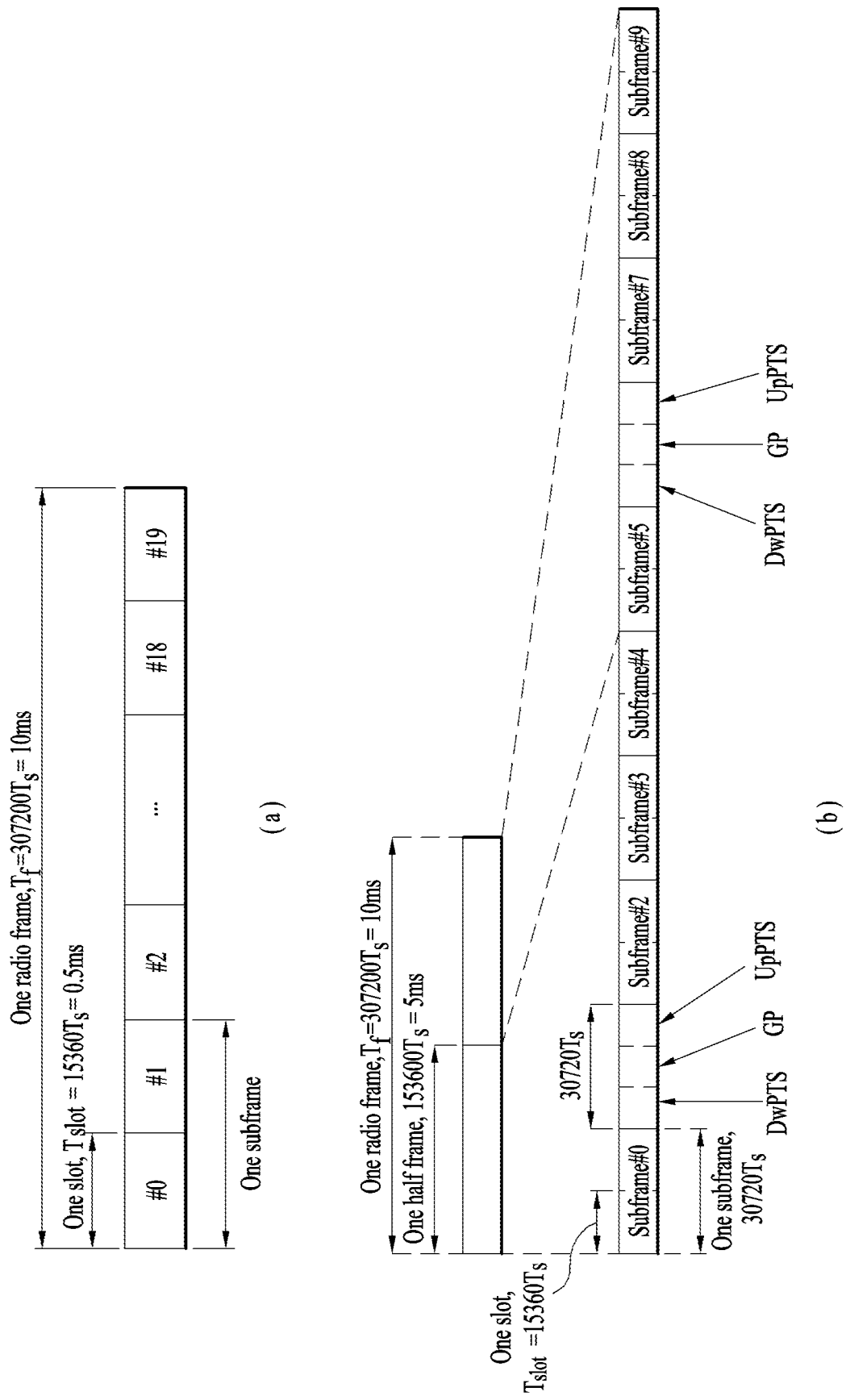
FIG. 2 is a diagram illustrating a structure of a radio frame for use in the embodiments.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

Figure 3:
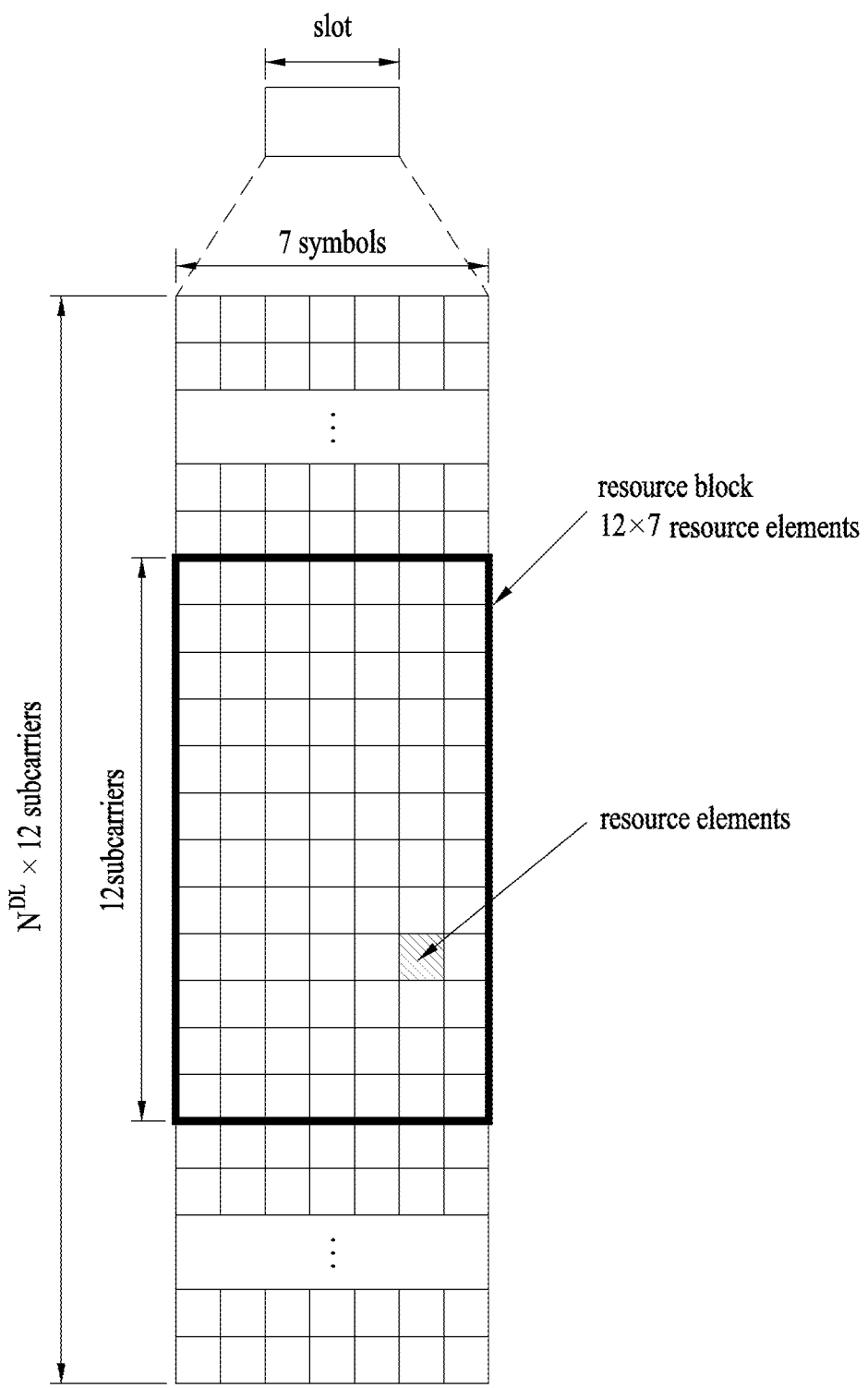
FIG. 3 is a diagram illustrating an example of a resource grid of a downlink slot according to the embodiments.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
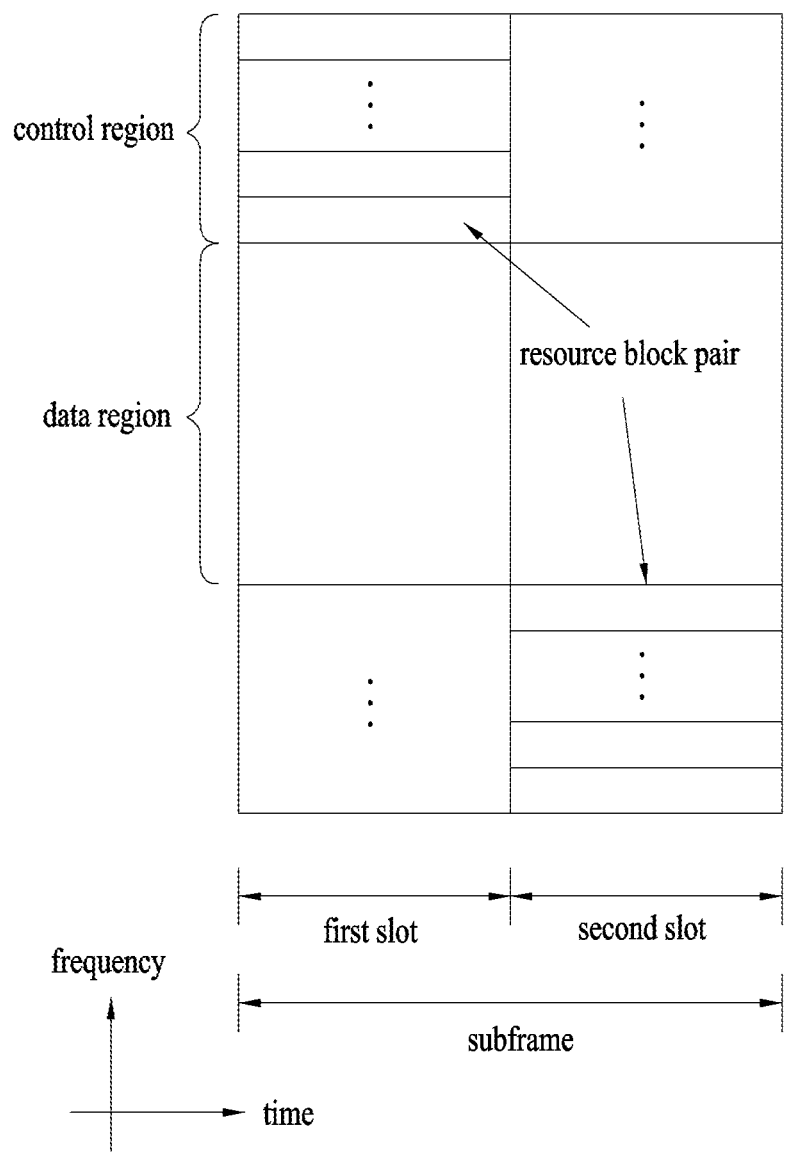
FIG. 4 is a diagram illustrating a structure of an uplink subframe according to the embodiments.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
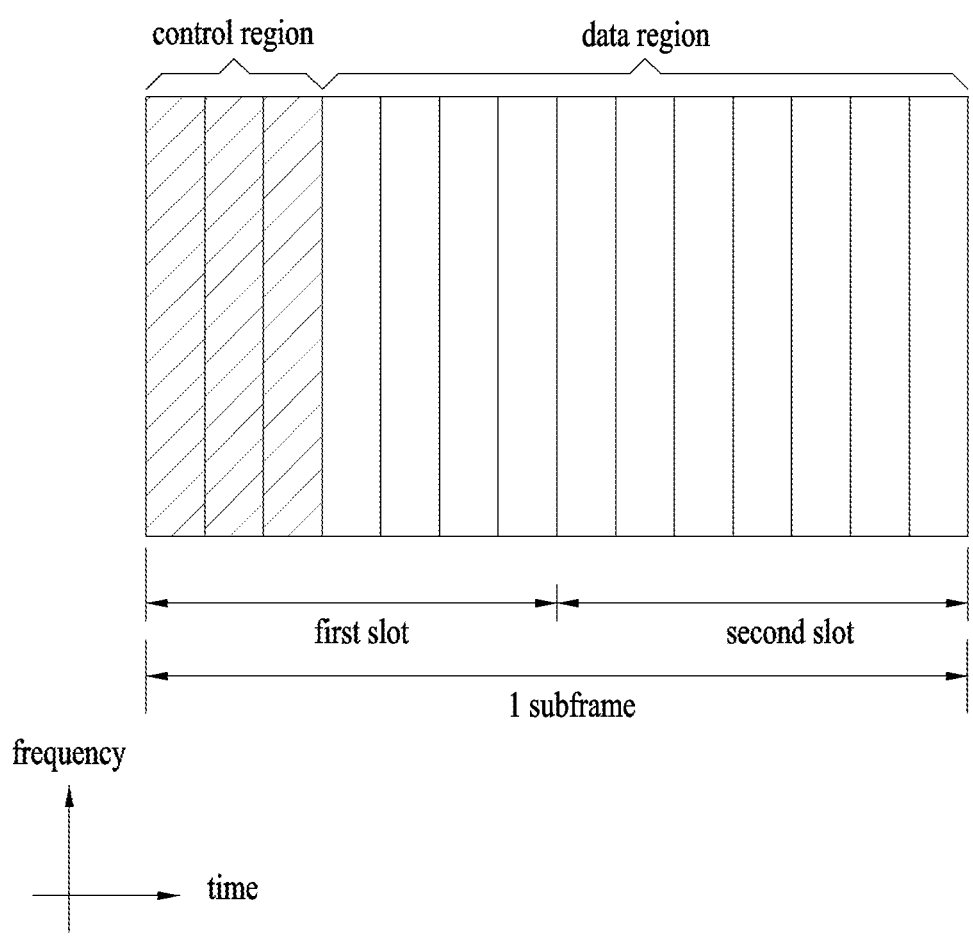
FIG. 5 is a diagram illustrating a structure of a downlink subframe according to the embodiments.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2 Physical Downlink Control Channel (PDCCH)

1.2.1 PDCCH Overview

The PDCCH may deliver information about resource allocation and a transport format for a Downlink Shared

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by NREG. Then the number of CCEs available to the system is NCCE ($=\lfloor N_{REG}/9 \rfloor$) and the CCEs are indexed from 0 to NCCE−1.

To simplify the decoding process of a UE, a PDCCH format including n CCEs may start with a CCE having an index equal to a multiple of n. That is, given CCE i, the PDCCH format may start with a CCE satisfying i mod n=0

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCEs (n) | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
| --- | --- |
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);
(2) Transmission mode 2: Transmit diversity;
(3) Transmission mode 3: Open-loop spatial multiplexing when the number of layer is larger than 1 or Transmit diversity when the rank is 1;
(4) Transmission mode 4: Closed-loop spatial multiplexing;
(5) Transmission mode 5: MU-MIMO;
(6) Transmission mode 6: Closed-loop rank-1 precoding;
(7) Transmission mode 7: Precoding supporting a single layer transmission, which is not based on a codebook (Rel-8);
(8) Transmission mode 8: Precoding supporting up to two layers, which are not based on a codebook (Rel-9);
(9) Transmission mode 9: Precoding supporting up to eight layers, which are not based on a codebook (Rel-10); and
(10) Transmission mode 10: Precoding supporting up to eight layers, which are not based on a codebook, used for CoMP (Rel-11).

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then, the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE NCCE,k−1. NCCE,k is the total number of CCEs in the control region of a kth subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

[Table 4] illustrates the sizes of CSSs and USSs.

TABLE 4

| PDCCH format | Number of CCEs (n) | Number of candidates in common search space | Number of candidates in dedicated search space |
| --- | --- | --- | --- |
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format 0/format 1a differentiation included in a PDCCH.

Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1, 2, 4, 8\}$. The CCEs of PDCCH candidate set m in the SS may be determined by the following equation.

$$L \cdot \{(Y_k+m) \bmod \lfloor N_{CCE,k}/L \rfloor\}+i \qquad \text{[Equation 1]}$$

where $M^{(L)}$ is the number of PDCCH candidates with CCE aggregation level L to be monitored in the SS, m=0, ..., $M^{(L)}$−1, i is the index of a CCE in each PDCCH candidate, and i=0, ..., L−1, $k=\lfloor n_s/2 \rfloor$ where $n_s$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 5

| Type | Search space $S_k^{(L)}$ Aggregation level L | Size [in CCEs] | Number of PDCCH candidates $M^{(L)}$ |
| --- | --- | --- | --- |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k=(A \cdot Y_{k-1}) \bmod D \qquad \text{[Equation 2]}$$

where $Y_{-1}=n_{RNTI} \neq 0$, $n_{RNTI}$ indicating an RNTI value. A=39827 and D=65537.

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguration message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 6:
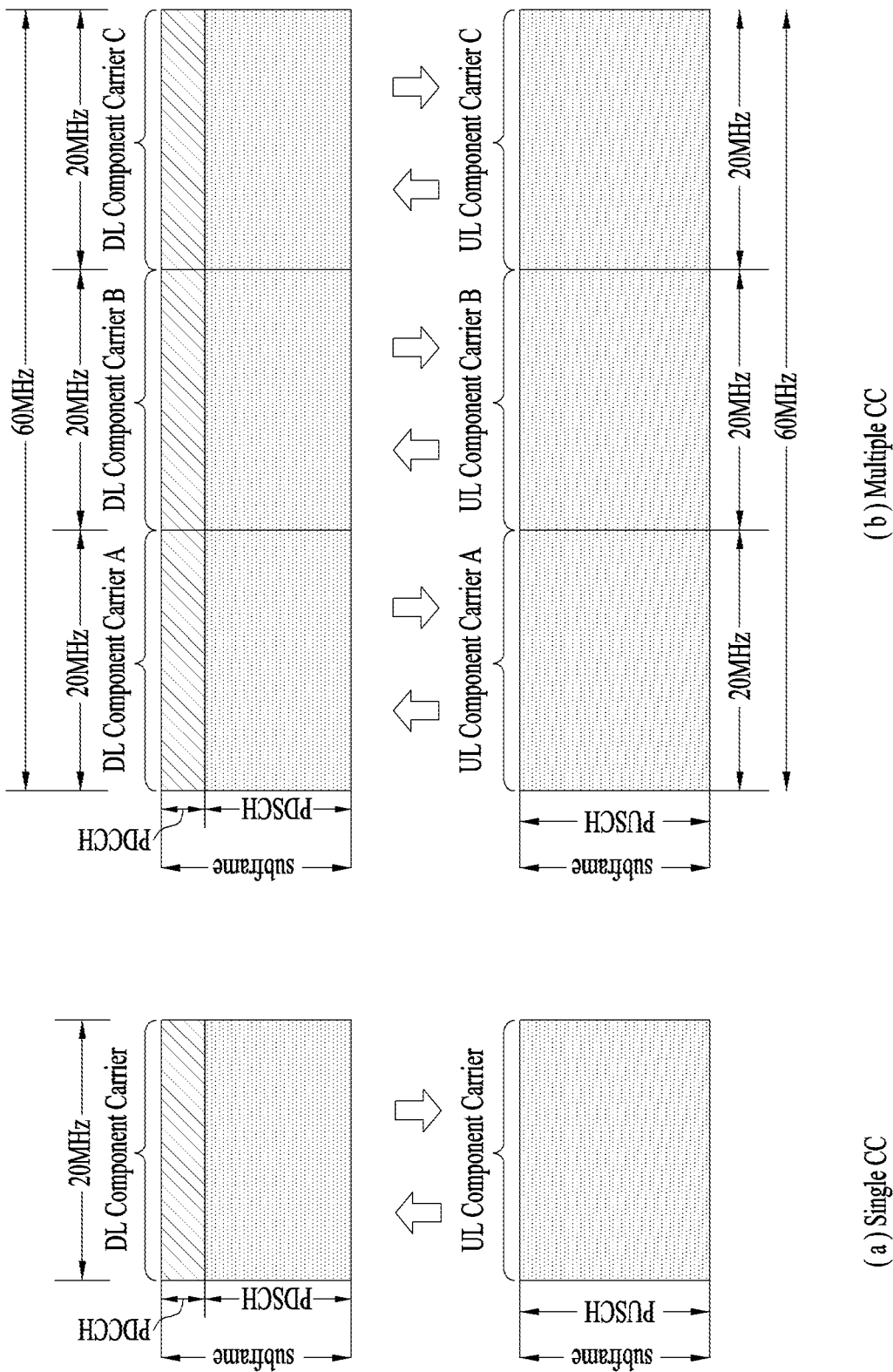
FIG. 6 is a diagram illustrating an example of a component carrier (CC) and carrier aggregation (CA) used in an LTE_A system.

FIG. 6 illustrates an example of CCs and CA in the LTE-A system, which are used in embodiments of the present disclosure.

FIG. 6(a) illustrates a single carrier structure in the LTE system. There are a DL CC and a UL CC and one CC may have a frequency range of 20 MHz.

FIG. 6(b) illustrates a CA structure in the LTE-A system. In the illustrated case of FIG. 6(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant or a mapping relationship between a DL CC (or a UL CC) carrying HARQ data and a UL CC (or a DL CC) carrying an HARQ ACK/NACK signal.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 7:
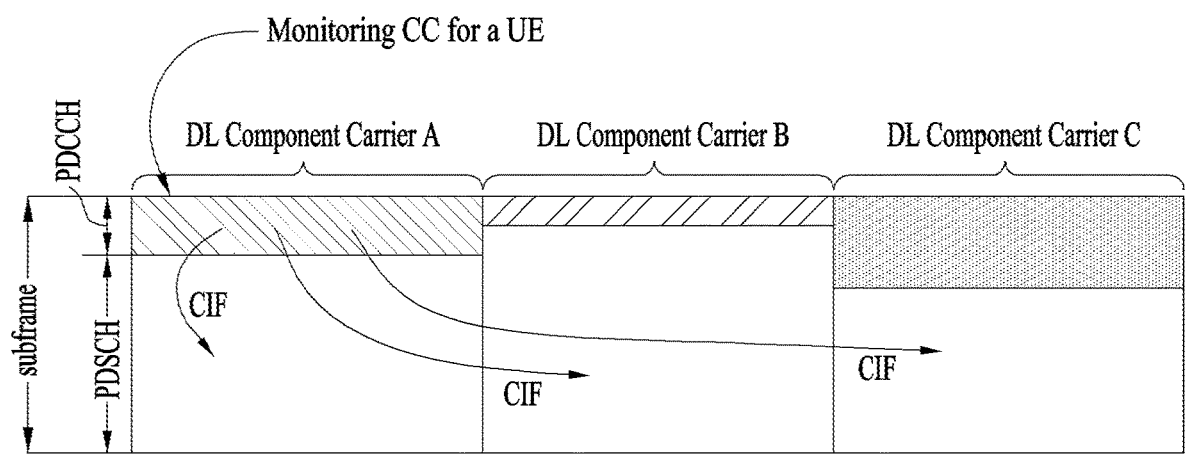
FIG. 7 illustrates a subframe structure of an LTE-A system according to cross-carrier scheduling.

FIG. 7 illustrates a cross carrier-scheduled subframe structure in the LTE-A system, which is used in embodiments of the present disclosure.

Referring to FIG. 7, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

Figure 8:
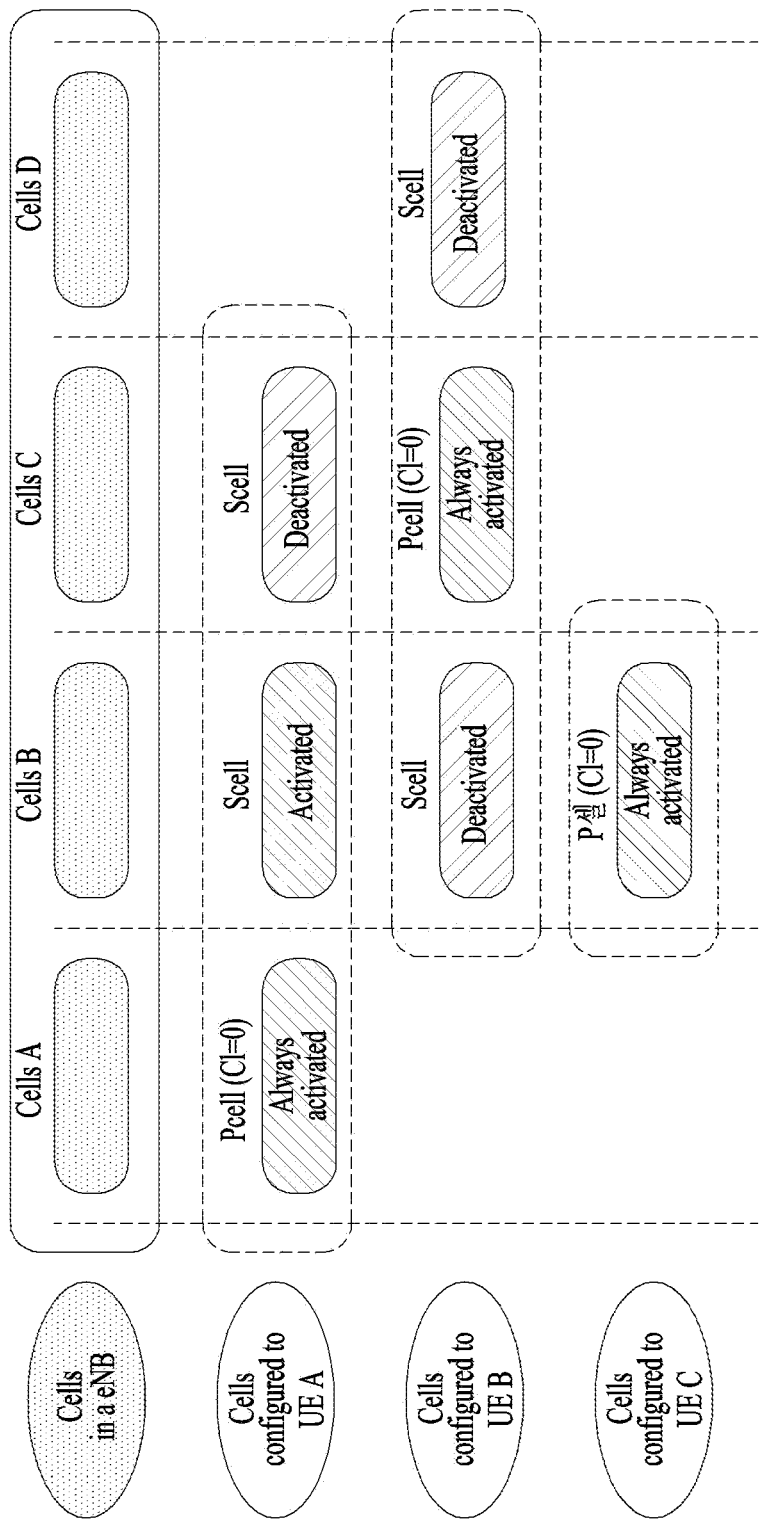
FIG. 8 is a conceptual diagram illustrating a construction of serving cells according to cross-carrier scheduling.

FIG. 8 is conceptual diagram illustrating a construction of serving cells according to cross-carrier scheduling.

Referring to FIG. 8, an eNB (or BS) and/or UEs for use in a radio access system supporting carrier aggregation (CA) may include one or more serving cells. In FIG. 8, the eNB can support a total of four serving cells (cells A, B, C and D). It is assumed that UE A may include Cells (A, B, C), UE B may include Cells (B, C, D), and UE C may include Cell B. In this case, at least one of cells of each UE may be composed of Pcell. In this case, Pcell is always activated, and Scell may be activated or deactivated by the eNB and/or UE.

The cells shown in FIG. 8 may be configured per UE. The above-mentioned cells selected from among cells of the eNB, cell addition may be applied to carrier aggregation (CA) on the basis of a measurement report message received from the UE. The configured cell may reserve resources for ACK/NACK message transmission in association with PDSCH signal transmission. The activated cell is configured to actually transmit a PDSCH signal and/or a PUSCH signal from among the configured cells, and is configured to transmit CSI reporting and Sounding Reference Signal (SRS) transmission. The deactivated cell is configured not to transmit/receive PDSCH/PUSCH signals by an eNB command or a timer operation, and CRS reporting and SRS transmission are interrupted.

2.3 CA Environment Based CoMP Operation

Hereinafter, a cooperation multi-point (CoMP) transmission operation applicable to the embodiments of the present invention will be described.

In the LTE-A system, CoMP transmission may be implemented using a carrier aggregation (CA) function in the LTE. FIG. 9 is a conceptual view illustrating a CoMP system operated based on a CA environment.

In FIG. 9, it is assumed that a carrier operated as a Pcell and a carrier operated as an Scell may use the same frequency band on a frequency axis and are allocated to two eNBs geographically spaced apart from each other. At this time, a serving eNB of UE1 may be allocated to the Pcell, and a neighboring cell causing much interference may be allocated to the Scell. That is, the eNB of the Pcell and the eNB of the Scell may perform various DL/UL CoMP operations such as joint transmission (JT), CS/CB and dynamic cell selection for one UE.

FIG. 9 illustrates an example that cells managed by two eNBs are aggregated as Pcell and Scell with respect to one UE (e.g., UE1). However, as another example, three or more cells may be aggregated. For example, some cells of three or more cells may be configured to perform CoMP operation for one UE in the same frequency band, and the other cells may be configured to perform simple CA operation in different frequency bands. At this time, the Pcell does not always need to participate in CoMP operation.

2.4 Reference Signal (RS)

Hereinafter, reference signals that can be used in the embodiments of the present invention will be described.

Figure 10:
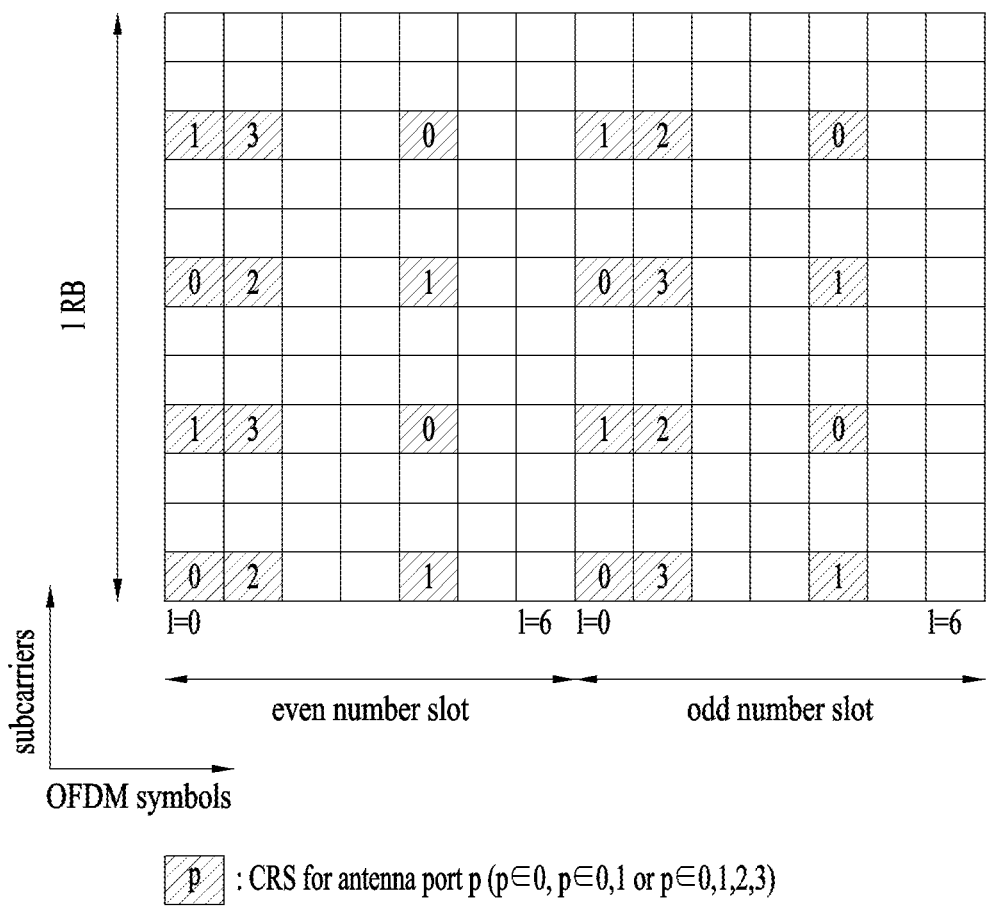
FIG. 10 illustrates an example of a subframe to which a cell specific reference signal (CRS) that can be used in the embodiments of the present invention is allocated.

FIG. 10 illustrates an example of a subframe to which a cell specific reference signal (CRS) that can be used in the embodiments of the present invention is allocated.

FIG. 10 illustrates an allocation structure of a CRS if four antennas are supported in a wireless access system. In a 3GPP LTE/LTE-A system, the CRS is used for decoding and channel state measurement. Therefore, the CRS is transmitted to all downlink bandwidths at all downlink subframes within a cell supporting PDSCH transmission, and is transmitted from all antenna ports configured in an eNB.

In more detail, CRS sequence is mapped to complex-valued modulation symbols used as reference symbols for an antenna port p at a slot $n_s$.

A UE may measure CSI by using the CRS, and may decode a downlink data signal received through a PDSCH at a subframe including the CRS, by using the CRS. That is, the eNB transmits the CRS from all RBs to a certain position within each RB, and the UE detects a PDSCH after performing channel estimation based on the CRS. For example, the UE measures a signal received at a CRS RE. The UE may detect a PDSCH signal from RE to which PDSCH is mapped, by using a ratio of receiving energy per CRS RE and a receiving energy per RE to which PDSCH is mapped.

As described above, if the PDSCH signal is transmitted based on the CRS, since the eNB should transmit the CRS to all RBs, unnecessary RS overhead is generated. To solve this problem, the 3GPP LTE-A system additionally defines UE-specific RS (hereinafter, UE-RS) and channel state information reference signal (CSI-RS) in addition to the CRS. The UE-RS is used for demodulation, and the CSI-RS is used to derive channel state information.

Since the UE-RS and the CRS are used for demodulation, they may be RSs for demodulation in view of use. That is, the UE-RS may be regarded as a kind of a demodulation reference signal (DM-RS). Also, since the CSI-RS and the CRS are used for channel measurement or channel estimation, they may be regarded as RSs for channel state measurement in view of use.

2.5 Enhanced PDCCH (EPDCCH)

In the 3GPP LTE/LTE-A system, cross carrier scheduling (CCS) in an aggregation status for a plurality of component carriers (CC: component carrier=(serving) cell) will be defined. One scheduled CC may previously be configured to be DL/UL scheduled from another one scheduling CC (that is, to receive DL/UL grant PDCCH for a corresponding scheduled CC). At this time, the scheduling CC may basically perform DL/UL scheduling for itself. In other words, a search space (SS) for a PDCCH for scheduling scheduling/scheduled CCs which are in the CCS relation may exist in a control channel region of all the scheduling CCs.

Meanwhile, in the LTE system, FDD DL carrier or TDD DL subframes are configured to use first n (n<=4) OFDM symbols of each subframe for transmission of physical channels for transmission of various kinds of control information, wherein examples of the physical channels include a PDCCH, a PHICH, and a PCFICH. At this time, the number of OFDM symbols used for control channel transmission at each subframe may be delivered to the UE dynamically through a physical channel such as PCFICH or semi-statically through RRC signaling.

Figure 11:
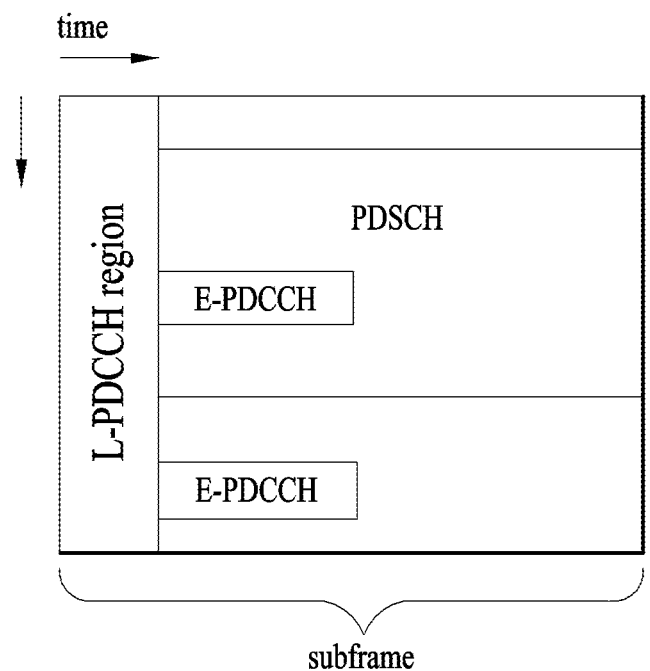
FIG. 11 illustrates an example that legacy PDCCH, PDSCH and E-PDCCH, which are used in an LTE/LTE-A system, are multiplexed.

Meanwhile, in the LTE/LTE-A system, since a PDCCH which is a physical channel for DL/UL scheduling and transmitting various kinds of control information has a limitation that it is transmitted through limited OFDM symbols, enhanced PDCCH (i.e., E-PDCCH) multiplexed with a PDSCH more freely in a way of FDM/TDM may be introduced instead of a control channel such as PDCCH, which is transmitted through OFDM symbol and separated from PDSCH. FIG. 11 illustrates an example that legacy PDCCH, PDSCH and E-PDCCH, which are used in an LTE/LTE-A system, are multiplexed.

2.6 CSI Feedback on PUCCH

First of all, in the 3GPP LTE system, when a DL reception entity (e.g., a UE) is connected to a DL transmission entity (e.g., a BS), the DL reception entity performs measurement on a Reference Signal Received Power (RSRP) of a reference signal transmitted in DL, a quality of a reference signal Reference Signal Received Quality (RSRQ) and the like at a random time and is then able to make a periodic or even-triggered report of a corresponding measurement result to the base station.

Each UE reports a DL channel information in accordance with a DL channel status via uplink. A base station is then able to determine time/frequency resources, MCS and the like appropriate for a data transmission to each UE using the DL channel information received from the each UE.

the corresponding period and the like are signaled to each UE by subframe unit and channel information in consideration of a transmission mode of each UE may be delivered to a base station via a physical uplink control channel (PUCCH) in accordance with a determined period. In case that data transmitted in uplink simultaneously exists in a subframe in which channel information is transmitted by a determined period, the corresponding channel information may be transmitted together with the data not on the PUCCH but on a PUSCH. In case of the periodic report via PUCCH, bits (e.g., 11 bits) limited further than those of the PUSCH may be used. RI and CQI/PMI may be transmitted on the same PUSCH.

In case that contention occurs between the periodic report and the aperiodic report in the same subframe, only the aperiodic report can be performed.

In calculating Wideband CQI/PMI, a most recently transmitted RI may be usable. RI in a PUCCH CSI report mode is independent from RI in a PUSCH CSI report mode. The RI in the PUSCH CSI report mode is valid for CQI/PMI in the corresponding PUSCH CSI report mode only.

Table 6 is provided to describe CSI feedback type transmitted on PUCCH and PUCCH CSI report mode.

TABLE 6

| | | | PMI Feedback Type | |
|---|---|---|---|---|
| | | | No PMI (OL, TD, single-antenna) | Single PMI (CL) |
| CQI Feedback Type | Wideband | | Mode 1-0<br>RI (only for Open-Loop SM)<br>One Wideband CQI (4 bit)<br>when RI > 1, CQI of first codeword | Mode 1-1<br>RI<br>Wideband CQI (4 bit)<br>Wideband spatial CQI (3 bit) for RI > 1<br>Wideband PMI (4 bit) |
| | UE Selected | | Mode 2-0<br>RI (only for Open-Loop SM)<br>Wideband CQI (4 bit)<br>Best-1 CQI (4 bit) in each BP<br>Best-1 indicator(L-bit label)<br>when RI > 1, CQI of first codeword | Mode 2-1<br>RI<br>Wideband CQI (4 bit)<br>Wideband spatial CQI (3 bit) for RI > 1<br>Wideband PMI (4 bit)<br>Best-1 CQI (4 bit) 1 in each BP<br>Best-1 spatial CQI (3 bit) for RI > 1<br>Best-1 indicator (L-bit label) |

Such CSI may include CQI, Precoding Matrix Indicator (PMI), Precoder Type Indication (PTI) and/or Rank Indication (RI). In particular, the CSI may be transmitted entirely or partially depending on a transmission mode of each UE. CQI is determined based on a received signal quality of a UE, which may be generally determined on the basis of a measurement of a DL reference signal. In doing so, a CQI value actually delivered to a base station may correspond to an MCS capable of providing maximum performance by maintaining a Block Error Rate (BLER) under 10% in the received signal quality measured by a UE.

This channel information reporting may be classified into a periodic report transmitted periodically and an aperiodic report transmitted in response to a request made by a base station.

In case of the aperiodic report, it is set for each UE by a 1-bit request bit (CQI request bit) contained in UL scheduling information downloaded to a UE by a base station. Having received this information, each UE is then able to deliver channel information to the base station via a physical uplink shared channel (PUSCH) in consideration of its transmission mode. And, it may set RI and CQI/PMI not to be transmitted on the same PUSCH.

In case of the periodic report, a period for transmitting channel information via an upper layer signal, an offset in Referring to Table 6, in the periodic report of channel information, there are 4 kinds of reporting modes (mode 1-0, mode 1-2, mode 2-0 and mode 2-1) in accordance with CQI and PMI feedback types.

CQI can be classified into Wideband (WB) CQI and Subband (SB) CQI in accordance with CQI feedback type and PMI can be classified into No PMI or Single PMI in accordance with a presence or non-presence of PMI transmission. In Table 11, No PMI corresponds to a case of Open-Loop (OL), Transmit Diversity (TD) and single-antenna, while Single PMI corresponds to a case of Closed-Loop (CL).

The mode 1-0 corresponds to a case that WB CQI is transmitted in the absence of PMI transmission. In this case, RI is transmitted only in case of OL Spatial Multiplexing (SM) and one WB CQI represented as 4 bits can be transmitted. If RI is greater than 1, CQI for a 1st codeword can be transmitted.

The mode 1-1 corresponds to a case that a single PMI and WB CQI are transmitted. In this case, 4-bit WB CQI and 4-bit WB PMI can be transmitted together with RI transmission. Additionally, if RI is greater than 1, 3-bit WB spatial differential CQI can be transmitted. In 2-codeword transmission, the WB spatial differential CQI may indicate a difference value between a WB CQI index for codeword 1 and a WB CQI index for codeword 2. The difference value in-between may have a value selected from a set {−4, −3, −2, −1, 0, 1, 2, 3} and can be represented as 3 bits.

The mode 2-0 corresponds to a case that CQI on a UE-selected band is transmitted in the absence of PMI transmission. In this case, RI is transmitted only in case of OL SM and a WB CQI represented as 4 bits may be transmitted. A best CQI (best-1) is transmitted on each Bandwidth Part (BP) and the best-1 CQI may be represented as 4 bits. And, an L-bit indicator indicating the best-1 may be transmitted together. If the RI is greater than 1, a CQI for a 1st codeword can be transmitted.

And, the mode 2-1 corresponds to a case that a single PMI and a CQI on a UE-selected band are transmitted. In this case, together with RI transmission, 4-bit WB CQI, 3-bit WB spiral differential CQI and 4-bit WB PMI can be transmitted. Additionally, 4-bit best-1 CQI is transmitted on each BP and L-bit best-1 indicator can be transmitted together. Additionally, if RI is greater than 1, 3-bit best-1 spatial differential CQI can be transmitted. In 2-codeword transmission, it may indicate a difference value between a best-1 CQI index of codeword 1 and a best-1 CQI index of codeword 2.

For the transmission modes, periodic PUCCH CSI report modes are supported as follows.

1) Transmission mode 1: Modes 1-0 and 2-0
2) Transmission mode 2: Modes 1-0 and 2-0
3) Transmission mode 3: Modes 1-0 and 2-0
4) Transmission mode 4: Modes 1-1 and 2-1
5) Transmission mode 5: Modes 1-1 and 2-1
6) Transmission mode 6: Modes 1-1 and 2-1
7) Transmission mode 7: Modes 1-0 and 2-0
8) Transmission mode 8: Modes 1-1 and 2-1 if a UE is set to make a PMI/RI reporting, or Modes 1-0 and 2-0 if a UE is set not to make a PMI/RI reporting
9) Transmission mode 9: Modes 1-1 and 2-1 if a UE is set to make a PMI/RI reporting and the number of CSI-RS ports is greater than 1, or Modes 1-0 and 2-0 if a UE is set not to make a PMI/RI reporting and the number of CSI-RS port(s) is equal to 1.

The periodic PUCCH CSIU reporting mode in each serving cell is set by upper layer signaling. And, the mode 1-1 is set to either submode 1 or submode 2 by an upper layer signaling using a parameter 'PUCCH_format1-1_CSI_reporting_mode'.

A CQI reporting in a specific subframe of a specific serving cell in a UE-selected SB CQI means a measurement of at least one channel state of a BP corresponding to a portion of a bandwidth of a serving cell. An index is given to the bandwidth part in a frequency increasing order starting with a lowest frequency without an increment of a bandwidth.

$N_{RB}^{DL}$ Indicates the number of RBs of a serving cell system bandwidth.

The system bandwidth may be divided into N (1, 2, 3, ... N) SB CQI subbands. One SB CQI may include k RBs defined in Table 15. If the number of RBs of the whole bandwidth is not a multiple integer of k ($\lceil N_{RB}^{DL}/k \rceil - \lfloor N_{RB}^{DL}/k \rfloor > 0$), the number of RBs configuring a last (i.e., Nth) SB CQI may be determined by [Equation 4].

$$N_{RB}^{DL} - k \cdot \lfloor N_{RB}^{DL}/k \rfloor \qquad \text{[Equation 4]}$$

Table 17 shows relationship among subband size k, BP and system bandwidth $N_{RB}^{DL}$.

TABLE 7

| System Bandwidth $N_{RB}^{DL}$ | Subband Size k (RBs) | Bandwidth Parts (J) |
|---|---|---|
| 6-7 | NA | NA |
| 8-10 | 4 | 1 |
| 11-26 | 4 | 2 |
| 27-63 | 6 | 3 |
| 64-110 | 8 | 4 |

Moreover, NJ CQI subbands configure one bandwidth part (BP) and a system bandwidth can be divided into J BPs. If J=1, NJ is equal to $\lceil N_{RB}^{DL}/k/J \rceil$. If J>1, NJ is equal to $\lceil N_{RB}^{DL}/k/J \rceil$ or $\lceil N_{RB}^{DL}/k/J \rceil - 1$. A UE calculates a CQI index for a preferred best one (best-1) CQI band in BP and may be then able to transmit the CQI index on PUCCH. In doing so, a best-1 indicator indicating what is the best-1 CQI subband selected from one BP may be transmitted together. The best-1 indicator may be configured with L bits, where the 'L' can be represented as [Equation 5].

$$L = \lceil \log_2 \lceil N_{RB}^{DL}/k/J \rceil \rceil \qquad \text{[Equation 5]}$$

In the above UE-selected CQI reporting mode, it is able to determine a frequency band in which a CQI index is calculated.

In the following description, a CQI transmission period is explained.

Table 8 shows CQI and PMI payload sizes of each PUCCH CSI report mode.

TABLE 8

| | | | PUCCH Reporting Modes | | | |
|---|---|---|---|---|---|---|
| PUCCH Format | Reported | Mode State | Mode 1-1 (bits/BP) | Mode 2-1 (bits/BP) | Mode 1-0 (bits/BP) | Mode 2-0 (bits/BP) |
| 1 | Sub-band CQI | RI = 1 | NA | 4 + L | NA | 4 + L |
| | | RI > 1 | NA | 7 + L | NA | 4 + L |
| 1a | Sub-band CQI/ second PMI | 8 antenna ports RI = 1 | NA | 8 + L | NA | NA |
| | | 8 antenna ports 1 < RI < 5 | NA | 9 + L | NA | NA |
| | | 8 antenna ports RI > 4 | NA | 7 + L | NA | NA |
| 2 | Wideband CQI/PMI | 2 antenna ports RI = 1 | 6 | 6 | NA | NA |
| | | 4 antenna ports RI = 1 | 8 | 8 | NA | NA |
| | | 2 antenna ports RI > 1 | 8 | 8 | NA | NA |
| | | 4 antenna ports RI > 1 | 11 | 11 | NA | NA |
| 2a | Wideband first PMI | 8 antenna ports RI < 3 | NA | 4 | NA | NA |
| | | 8 antenna ports 2 < RI < 8 | NA | 2 | NA | NA |
| | | 8 antenna ports RI = 8 | NA | 0 | NA | NA |

TABLE 8-continued

| PUCCH Format | Reported | Mode State | PUCCH Reporting Modes | | | |
|---|---|---|---|---|---|---|
| | | | Mode 1-1 (bits/BP) | Mode 2-1 (bits/BP) | Mode 1-0 (bits/BP) | Mode 2-0 (bits/BP) |
| 2b | Wideband CQI/ second PMI | 8 antenna ports RI = 1 | 8 | 8 | NA | NA |
| | | 8 antenna ports 1 < RI < 4 | 11 | 11 | NA | NA |
| | | 8 antenna ports RI = 4 | 10 | 10 | NA | NA |
| | | 8 antenna ports RI > 4 | 7 | 7 | NA | NA |
| 2c | Wideband CQI/first PMI/ second PMI | 8 antenna ports RI = 1 | 8 | — | NA | NA |
| | | 8 antenna ports 1 < RI ≤ 4 | 11 | — | NA | NA |
| | | 8 antenna ports 4 < RI ≤ 7 | 9 | — | NA | NA |
| | | 8 antenna ports RI = 8 | 7 | — | NA | NA |
| 3 | RI | 2-layer spatial multiplexing | 1 | 1 | 1 | 1 |
| | | 4-layer spatial multiplexing | 2 | 2 | 2 | 2 |
| | | 8-layer spatial multiplexing | 3 | 3 | NA | NA |
| 4 | Wideband CQI | RI = 1 or RI > 1 | NA | NA | 4 | 4 |
| 5 | RI/first PMI | 8 antenna ports, 2-layer spatial multiplexing | 4 | NA | NA | NA |
| | | 8 antenna ports, 4 and 8-layer spatial multiplexing | 5 | | | |
| 6 | RI/PTI | 8 antenna ports, 2-layer spatial multiplexing | NA | 2 | NA | NA |
| | | 8 antenna ports, 4-layer spatial multiplexing | NA | 3 | NA | NA |
| | | 8 antenna ports, 8-layer spatial multiplexing | NA | 4 | NA | NA |

Referring to Table 8, each CQI/PMI and RI reporting type (PUCCH reporting type) supported for PUCCH CSI report mode can be described as follows.

Reporting Type 1 supports CQI feedback for a subband selected by a UE.

Reporting Type 1a supports subband CQI and 2nd PMI feedback.

Reporting Type 2/2b/2c supports WB CQI and PMI feedback.

Reporting Type 2a supports WB PMI feedback.

Reporting Type 3 supports RI feedback.

Reporting Type 4 supports WB CQI.

Reporting Type 5 supports RI and WB PMI feedback.

Reporting Type 6 supports RI and PTI feedback.

A UE can receive information including a combination of a transmission period of channel information and an offset from an upper layer by RRC signaling. The UE can transmit the channel information to a base station based on the provided information on the channel information transmission period. In each serving cell, a period $N_{pd}$ in a subframe for a CQI/PMI reporting and an offset $N_{OFFSET,CQI}$ in the subframe are determined based on a parameter 'cqi-pmi-ConfigIndex' ($I_{CQI/PMI}$) set up by upper layer signaling [cf. Table 14 and Table 15]. An offset $N_{OFFSET,RI}$ related to a period $M_{RI}$ for an RI reporting is determined based on a parameter 'ri-ConfigIndex' ($I_{RI}$) [cf. Table 16]. The offset $N_{OFFSET,RI}$ for the RI reporting has a value of $\{0, -1 \ldots -(N_{pd}-1)\}$ In case that a UE is set to report abnormality of one CSI subframe set, the 'cqi-pmi-ConfigIndex' and the 'ri-ConfigIndex' correspond to the period and offset of CQI/PMI and RI for a subframe set 1, respectively. And, the 'cqi-pmi-ConfigIndex2' and the 'ri-ConfigIndex2' correspond to the period and offset of CQI/PMI and RI for a subframe set 2, respectively.

Table 9 shows the mapping relation between Npd and NOFFSET,CQI of a parameter ICQI/PMI in FDD.

TABLE 9

| $I_{CQI/PMI}$ | Value of $N_{pd}$ | Value of $N_{OFFSET,CQI}$ |
|---|---|---|
| $0 \leq I_{CQI/PMI} \leq 1$ | 2 | $I_{CQI/PMI}$ |
| $2 \leq I_{CQI/PMI} \leq 6$ | 5 | $I_{CQI/PMI}-2$ |
| $7 \leq I_{CQI/PMI} \leq 16$ | 10 | $I_{CQI/PMI}-7$ |
| $17 \leq I_{CQI/PMI} \leq 36$ | 20 | $I_{CQI/PMI}-17$ |
| $37 \leq I_{CQI/PMI} \leq 76$ | 40 | $I_{CQI/PMI}-37$ |
| $77 \leq I_{CQI/PMI} \leq 156$ | 80 | $I_{CQI/PMI}-77$ |
| $157 \leq I_{CQI/PMI} \leq 316$ | 160 | $I_{CQI/PMI}-157$ |
| $I_{CQI/PMI} = 317$ | | Reserved |
| $318 \leq I_{CQI/PMI} \leq 349$ | 32 | $I_{CQI/PMI}-318$ |
| $350 \leq I_{CQI/PMI} \leq 413$ | 64 | $I_{CQI/PMI}-350$ |
| $414 \leq I_{CQI/PMI} \leq 541$ | 128 | $I_{CQI/PMI}-414$ |
| $542 \leq I_{CQI/PMI} \leq 1023$ | | Reserved |

Table 10 shows the mapping relation between Npd and NOFFSET,CQI of a parameter ICQI/PMI in TDD.

TABLE 10

| $I_{CQI/PMI}$ | Value of $N_{pd}$ | Value of $N_{OFFSET,CQI}$ |
|---|---|---|
| $I_{CQI/PMI} = 0$ | 1 | $I_{CQI/PMI}$ |
| $1 \leq I_{CQI/PMI} \leq 5$ | 5 | $I_{CQI/PMI}-1$ |
| $6 \leq I_{CQI/PMI} \leq 15$ | 10 | $I_{CQI/PMI}-6$ |
| $16 \leq I_{CQI/PMI} \leq 35$ | 20 | $I_{CQI/PMI}-16$ |
| $36 \leq I_{CQI/PMI} \leq 75$ | 40 | $I_{CQI/PMI}-36$ |
| $76 \leq I_{CQI/PMI} \leq 155$ | 80 | $I_{CQI/PMI}-76$ |
| $156 \leq I_{CQI/PMI} \leq 315$ | 160 | $I_{CQI/PMI}-156$ |
| $316 \leq I_{CQI/PMI} \leq 1023$ | | Reserved |

Table 11 shows the mapping relation between MRI and NOFFSET,RI of a parameter IRI in TDD.

TABLE 11

| $I_{RI}$ | Value of $M_{RI}$ | Value of $N_{OFFSET,RI}$ |
|---|---|---|
| 0 ≤ $I_{RI}$ ≤ 160 | 1 | — $I_{RI}$ |
| 161 ≤ $I_{RI}$ ≤ 321 | 2 | — ($I_{RI}$-161) |
| 322 ≤ $I_{RI}$ ≤ 482 | 4 | — ($I_{RI}$-322) |
| 483 ≤ $I_{RI}$ ≤ 643 | 8 | — ($I_{RI}$-483) |
| 644 ≤ $I_{RI}$ ≤ 804 | 16 | — ($I_{RI}$-644) |
| 805 ≤ $I_{RI}$ ≤ 965 | 32 | — ($I_{RI}$-805) |
| 966 ≤ $I_{RI}$ ≤ 1023 | | Reserved |

2.7 Restricted CSI Measurement

To mitigate the effect of interference between cells in a wireless network, network entities may cooperate with each other. For example, other cells except a cell A transmit only common control information without transmitting data during the duration of a specific subframe for which the cell A transmits data, whereby interference with a user receiving data in the cell A may be minimized.

In this way, interference between cells may be mitigated by transmitting only minimal common control information from other cells except a cell transmitting data at a specific time through cooperation between cells in a network.

For this purpose, if a higher layer configures two CSI measurement subframe sets CCSI,0 and CCSI,1, a UE may perform Resource-Restricted Measurement (RRM). At this time, it is assumed that CSI reference resources corresponding to the two measurement subframe sets belong to only one of the two subframe sets.

The following Table 12 illustrates an example of a higher-layer signal that configures CSI subframe sets.

TABLE 12

```
CQI-ReportConfig-r10 ::=    SEQUENCE {
    cqi-ReportAperiodic-r10        CQI-ReportAperiodic-r10     OPTIONAL,
    -- Need ON
    nomPDSCH-RS-EPRE-Offset        INTEGER (-1..6),
    cqi-ReportPeriodic-r10         CQI-ReportPeriodic-r10      OPTIONAL,
    -- Need ON
    pmi-RI-Report-r9               ENUMERATED {setup}          OPTIONAL,
    csi-SubframePatternConfig-r10  CHOICE {
        release                        NULL,
        setup                          SEQUENCE {
            csi-MeasSubframeSet1-r10       MeasSubframePattern-r10,
            csi-MeasSubframeSet2-r10       MeasSubframePattern-r10
        }
    }                                                          OPTIONAL --
Need ON
}
```

Table 12 illustrates an example of CQI report configuration (CQI-Report Config) message transmitted to configure CSI subframe sets. The CQI-Report configuration message may include an aperiodic CQI report cqi-ReportAperiodic-r10 Information Element (IE), a nomPDSCH-RS-EPRE-Offset IE, a periodic CQI report cqi-ReportPeriodic-r10 IE, a PMI-RI report pmi-RI-Report-r9 IE, and a CSI subframe pattern configuration csi-subframePatternConfig IE. At this time, the CSI subframe pattern configuration IE includes CSI measurement subframe set 1 information csi-MeasSubframeSet1 IE and a CSI measurement subframe set 2 information csi-MeasSubframeSet2 IE, which indicate measurement subframe patterns for the respective subframe sets.

In this case, each of the csi-MeasSubframeSet1-r10 IE and the csi-MeasSubframeSet2-r10 IE is 40-bit bitmap information representing information on subframes belonging to each subframe set. Also, aperiodic CQI report CQI-ReportAperiodic-r10 IE is used to configure an aperiodic CQI report for the UE, and the periodic CQI report CQI-ReportPeriodic-r10 is used to configure a periodic CQI report for the UE.

The nomPDSCH-RS-EPRE-Offset IE indicates a value of $\Delta_{offset}$. At this time, an actual value is set to $\Delta_{offset}$ value*2 [dB]. Also, the PMI-RI report IE indicates configuration or non-configuration of a PMI/RI report. Only when a transmission mode is set to TM8, TM9, or TM10, the E-UTRAN configures the PMI-RI Report IE.

3. LTE-U System 3.1 LTE-U System Configuration

Hereinafter, methods for transmitting and receiving data in a carrier aggregation environment of an LTE-A band corresponding to a licensed band and an unlicensed band will be described. In the embodiments of the present invention, an LTE-U system means an LTE system that supports such a CA status of a licensed band and an unlicensed band. A WiFi band or Bluetooth (BT) band may be used as the unlicensed band.

Figure 12:
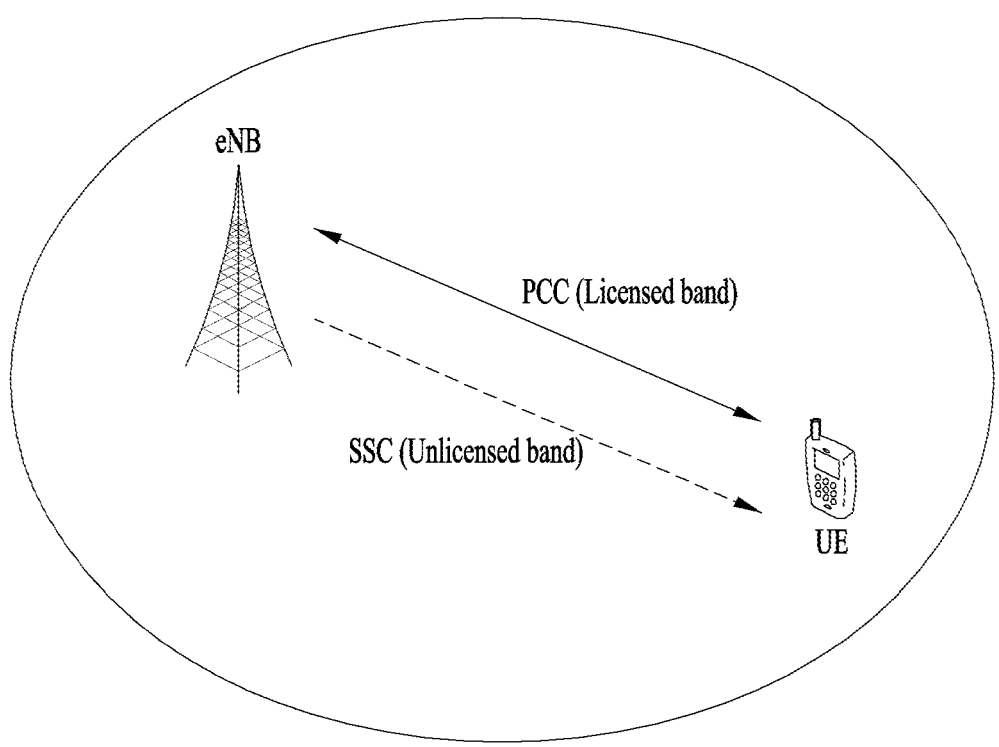
FIG. 12 illustrates an example of a CA environment supported in an LTE-U system.

FIG. 12 illustrates an example of a CA environment supported in an LTE-U system.

Hereinafter, for convenience of description, it is assumed that a UE is configured to perform wireless communication in each of a licensed band and an unlicensed band by using two component carriers (CCs). The methods which will be described hereinafter may be applied to even a case where three or more CCs are configured for a UE.

In the embodiments of the present invention, it is assumed that a carrier of the licensed band may be a primary CC (PCC or Pcell), and a carrier of the unlicensed band may be a secondary CC (SCC or Scell). However, the embodiments of the present invention may be applied to even a case where a plurality of licensed bands and a plurality of unlicensed bands are used in a carrier aggregation method. Also, the methods suggested in the present invention may be applied to even a 3GPP LTE system and another system.

In FIG. 12, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 12 is only example, and the embodiments of the present invention may be applied to even a CA environment that one UE accesses a plurality of eNBs.

For example, the UE may configure a macro eNB (M-eNB) and a Pcell, and may configure a small eNB (S-eNB) and an Scell. At this time, the macro eNB and the small eNB may be connected with each other through a backhaul network.

In the embodiments of the present invention, the unlicensed band may be operated in a contention-based random access method. At this time, the eNB that supports the unlicensed band may perform a carrier sensing (CS) procedure prior to data transmission and reception. The CS procedure determines whether a corresponding band is reserved by another entity.

For example, the eNB of the Scell checks whether a current channel is busy or idle. If it is determined that the corresponding band is idle state, the eNB may transmit a scheduling grant to the UE to allocate a resource through (E)PDCCH of the Pcell in case of a cross carrier scheduling mode and through PDCCH of the Scell in case of a self-scheduling mode, and may try data transmission and reception.

At this time, the eNB may configure a transmission opportunity (TxOP) duration comprised of N consecutive subframes. In this case, a value of N and a use of the N subframes may previously be notified from the eNB to the UE through higher layer signaling through the Pcell or through a physical control channel or physical data channel.

3.2 TxOP Duration

An eNB may transmit and receive data to and from one UE for a TxOP duration, and may configure a TxOP duration comprised of N consecutive subframes for each of a plurality of UEs and transmit and receive data in accordance with TDM or FDM. At this time, the eNB may transmit and receive data through a Pcell which is a licensed band and an Scell which is an unlicensed band for the TxOP duration.

However, if the eNB transmits data in accordance with a subframe boundary of an LTE-A system corresponding to a licensed band, a timing gap may exist between an idle determination timing of the Scell which is an unlicensed band and an actual data transmission timing. Particularly, since the Scell should be used as an unlicensed band, which cannot be used exclusively by a corresponding eNB and a corresponding UE, through CS based contention, another system may try information transmission for the timing gap.

Therefore, the eNB may transmit a reservation signal from the Scell to prevent another system from trying information transmission for the timing gap. In this case, the reservation signal means a kind of "dummy information" or "a copy of a part of PDSCH" transmitted to reserve a corresponding resource region of the Scell as a resource of the eNB. The reservation signal may be transmitted for the timing gap (i.e., from the idle determination timing of the Scell to the actual transmission timing).

4. TxOP Duration Configuration Method 4.1 System Information Transmission Method There may exist system information on a Scell commonly required by UEs within the coverage of the Scell (or a UE group within the coverage of the Scell). For example, the system information can include a start point of a TxOP duration, TxOP configuration information on a usage and/or a size, Scell on/off information for measuring cell, and the like.

In order to transmit the system information to UEs (or a UE group) belonging to the coverage of the Scell when DL data transmission is not performed on the Scell (i.e., at the outside of a TxOP duration), it may be efficient to utilize a common search space (CSS) for transmitting (E)PDCCH in a Pcell.

Yet, in a current LTE-A system, since cross carrier scheduling (CCS) is not permitted in the CSS of the Pcell (or, since a CIF (carrier indicator field) is unable to exist on a DCI format transmitted from the CSS of the Pcell), it is difficult to inform UEs of information on a specific Scell via a DCI format transmitted from the CSS. And, if the system information is individually transmitted to UEs (or a UE group) belonging to the coverage of the Scell via a UE-specific search space, it may cause excessive signaling overhead.

Hence, in order to solve the aforementioned problem, it may be able to redefine a legacy DCI format in a CSS of (E)PDCCH or it may be able to define a new DCI format in a Pcell.

4.1.1 Method of Utilizing DCI Format 3/3A

In the following, a method of transmitting system information common to Scells by redefining a DCI format 3/3A is explained. Although the DCI format 3/3A is explained as an example, methods described in the following can be extensively applied to a different DCI format as well.

Figure 13:
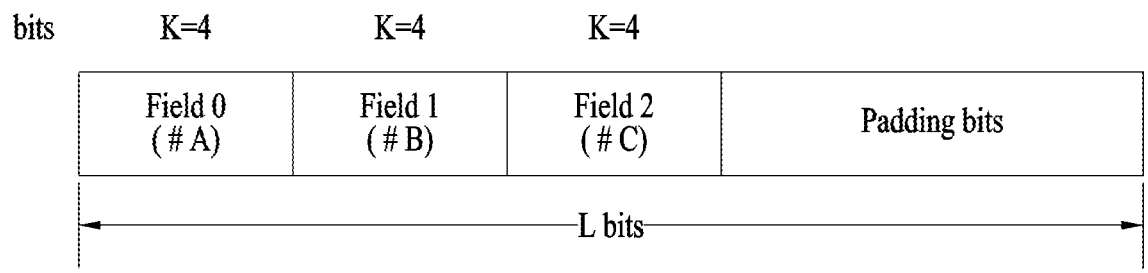
FIG. 13 is a diagram for an example of a DCI format for transmitting system information on a Scell.

FIG. 13 is a diagram for an example of a DCI format for transmitting system information on a Scell.

In LTE/LTE-A system, fields of a DCI format 3/3A are configured in a unit of 2 bits or 1 bit. However, according to embodiments of the present invention, the DCI format 3/3A can be configured in a unit of K bits equal to or greater than 2 bits (refer to FIG. 13).

For example, fields of K bits included in the DCI format 3/3A can include a TxOP start point and system information on an Scell commonly required by UEs belonging to the coverage of the Scell (or a UE group belonging to the coverage of the Scell). In this case, a unit 'K' of a field may correspond to a predetermined value or can be configured through a higher layer signal (e.g., a MAC signal or an RRC signal).

If SCells configured on a plurality of unlicensed bands are used by a carrier aggregation (CA) technique, it is able to fill a field with system information on each of a plurality of the unlicensed bands. And, system information on a plurality of Scells can be included in a field and system information on a single Scell can be included in a plurality of fields. In this case, it may be able to inform a UE or a UE group of system information on a certain Scell included in each of fields constructing the DCI format 3/3A through a higher layer signal or a physical layer signal (e.g., PDCCH or EPDCCH).

And, an eNB can inform a UE of information on a field to be read by the UE via a higher layer signal. For example, the eNB can inform a UE of an index of a field to be read by the UE.

For example, assume that there exist 3 unlicensed band Scells used for a carrier aggregation technique and the Scells correspond to a Scell #A, a Scell #B, and a Scell #C, respectively, in FIG. 13. In this case, it shows a case that system information to be transmitted according to each Scell corresponds to 4 bits. In this case, an eNB can inform a UE of an index of a field to be read by the UE and system information on a prescribed Scell corresponding to information on the field.

For example, assume that a UE 1 is able to communicate with the Scell #A and the Scell #B. In this case, the eNB can inform the UE 1 of indexes indicating a field 0 and a field 1 and a fact that system information on the Scell #A is included in the field 0 and system information on the Scell #B is included in the field 1 through a higher layer signal.

In FIG. 13, although a case that the K corresponding to a size of fields constructing the DCI format 3/3A is 4 bits is assumed, this is an example only. A value of the K may vary according to system environment, a channel status and/or Scell configuration status, and the like.

As a different aspect of the present invention, assume that the total length of the DCI format proposed in FIG. 13 corresponds to L bits. In this case, if each field is configured by K bits, the maximum number of fields N_{max} included in the DCI format can be configured by floor(L/K). If the floor(L/K) is less than L/K, an eNB performs zero padding on the remaining K−(L modulo K) bits and transmits it to a UE. And, if the number of fields required by the eNB is less than the N_{max}, the eNB can perform zero padding on the remained fields on which information is not loaded. Or, the eNB performs padding on the remained fields with a predetermined known signal (i.e., utilizing as a virtual CRC) to increase decoding probability of a UE.

As a further different aspect of the present invention, LTE/LTE-A system defines a payload size of a DCI format 3/3A to be identically maintained with a size of a DCI format 0. Yet, according to the embodiments of the present invention, it may be able to configure a payload size of a newly configured DCI format 3/3A to be smaller to reduce overhead for transmitting a control signal.

For example, it may be able to configure a payload size of a DCI format proposed by the present invention to be identical to a payload size of a DCI format 1C used in compact scheduling. In particular, if a payload size of a legacy DCI format is reused, it may be able to reduce complexity of blind decoding performed by a UE.

Figure 14:
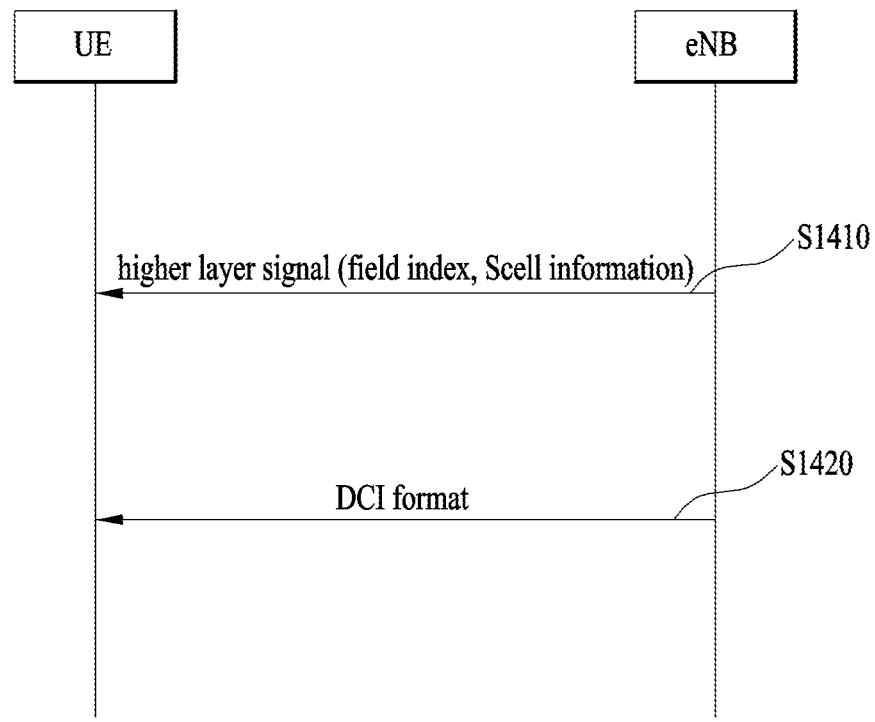
FIG. 14 is a flowchart for one of methods for an eNB to transmit system information to a UE.

FIG. 14 is a flowchart for one of methods for an eNB to transmit system information to a UE.

Referring to FIG. 14, an eNB can transmit a field index indicating a field used for a UE among fields included in a DCI format to be decoded by the UE and Scell information indicating whether or not each field includes system information on a prescribed Scell to the UE using a higher layer signal [S1410].

Having received the field index and the Scell information in the step S1410, the UE can decode a field indicated by the field index among the fields included in the DCI format 3/3A. In this case, a DCI format used in the step S1420 may correspond to the DCI format 3/3A mentioned earlier in FIG. 13. The UE can check whether or not a field includes system information on a prescribed Scell based on the Scell information [S1420].

Hence, the UE receives the DCI format 3/3A, obtains system information on a Scell assigned to the UE, and may be able to transmit and receive data in a TxOP duration of the Scell.

And, the UE can maintain the field index and/or the Scell information received in the step S1410 until a higher layer signal including a new field index and/or Scell information is received.

4.2 Redefining Resource Allocation Field of DCI Format

An eNB can transceive data with a UE during a TxOP duration and can transceive data with a plurality of UEs. And, the eNB sets a TxOP duration consisting of N number of contiguous subframes (SFs) and may be then able to transmit and receive data using TDM or FDM scheme.

In this case, if the eNB transceives data with a UE via full band transmission using the TDM scheme, the eNB may be able to get rid of a resource allocation field used for allocating a resource to the UE from a DCI format or the eNB can considerably reduce a size of the resource allocation field to use the field as a different usage. This is because, in case of the full band transmission, it is not necessary for the eNB to separately inform the UE of a position of an allocated resource region (i.e., RB (resource block), etc.).

In other word, since each UE transceives data with the eNB using the whole of allocated RBs in an SF, the eNB can transmit DCI only including a CRC scrambled with a C-RNTI value to the UE. In particular, it is not necessary to perform resource allocation via a separate resource allocation field in a DCI format.

Hence, when an eNB schedules a UE for receiving DL data in a Scell via a CCS, the eNB can reduce overhead for transmitting a control signal by eliminating a resource allocation field included in a DCI format or using the resource allocation field as a different usage.

As a different aspect of the present invention, the aforementioned method can also be applied to a case that an eNB transmits and receives data using FDM scheme.

For example, when LTE/LTE-A system supports 100 RBs, a size of a resource block group (RBG) corresponds to 4 RBs in response to a resource allocation type 0 of 100-RB system. In particular, if the RBG size of the 100-RB system is changed to X RBs (X>4) greater than 4 RBs in LTE-U system, it may be able to reduce the maximum number of bits of a resource allocation field necessary for configuring a DCI. Hence, an eNB can reduce overhead for transmitting a control signal by transmitting system information using the remaining bits, using the remaining bits as a different usage, or eliminating the remaining bits.

4.3 Method of Configuring TxOP Duration

The methods mentioned earlier in the paragraphs 1 to 4.2 can be applied to methods of configuring a TxOP duration described in the following.

FIG. 15 is a diagram for one of methods of configuring a TxOP duration.

As shown in FIG. 15 (a), although an eNB performs carrier sensing (CS) from an SF #N−1 to start a TxOP duration at an SF #N, due to the characteristic of a unlicensed band operation, a channel status may not be determined as an idle state until a timing point at which the SF #N starts. In FIG. 15 (a), if a channel of a Scell is determined as an idle state from a second slot of the SF #N, the eNB transmits a reservation signal during the second slot of the SF #N and then the eNB should attempt to transmit DL data in an SF #N+1.

Yet, if the eNB operates as FIG. 15 (a), since the eNB uses a radio resource as much as 1 slot for transmitting a reservation signal, resource waste may occur. Hence, in order to efficiently utilize a radio resource, although the channel state is determined as the idle state from the second slot of the SF #N, the eNB can be configured to immediately attempt to transmit DL data without transmitting the reservation signal at the slot.

In particular, the eNB informs the UE that a TxOP duration starts at the SF #N irrespective of the idle state and the busy state of the Scell at a timing point at which the SF #N starts and the eNB can immediately attempt to transmit DL data from the second slot at which the channel state becomes the idle state by starting CS before the SF #N starts.

In this case, as a different aspect of the present invention, the TxOP duration starting at the SF #N can be configured by a higher layer signal.

Or, as a different aspect of the present invention, the eNB can inform the UE that the TxOP duration starts at the SF #N of the Scell via (E)PDCCH of an SF #N or (E)PDCCH of an SF #N−k of a Pcell. For example, the eNB can transmit system information including a start point of the TxOP duration, a usage of the TxOP duration, a length of the TxOP duration, and the like to the UE using the DCI format 3/3A mentioned earlier in FIGS. 13 and 14 (refer to paragraph 4.1).

In FIG. 15 (b), assume that the TxOP duration is configured by 3 subframes (SFs). In this case, as shown in FIG. 15

(b), the eNB can attempt to transmit DL data during the 3 SFs (i.e., 14*3 OFDM symbols with normal CP and 12*3 OFDM symbols with extended CP) from an OFDM symbol at which transmission of actual data started.

As shown in FIG. 15 (c), although actual data transmission starts in the middle of the SF #N, the eNB can configure an duration ranging from the SF #N, which is configured as the start point of the TxOP, to a timing point at which 3 SFs are passed and an SF #N+2 ends as a TxOP duration. In particular, the TxOP duration can be configured in a unit of SF.

The method of configuring the TxOP shown in FIG. 15 (b) has a merit in that the number of SFs capable of being used on an actual Scell is constantly maintained and the method of configuring the TxOP shown in FIG. 15 (c) has a merit in that ACK/NACK timing for data transmission in the TxOP duration is constantly maintained.

FIG. 16 is a flowchart for a different method of configuring a TxOP duration.

Referring to FIG. 15 (b), although a TxOP duration is set in the middle of an SF #N, a timing point at which actual data is transmitted and received may correspond to a timing point at which several OFDM symbols are passed away from the point to which the TxOP duration is set due to a channel state. Hence, in order for a scheduled UE to successfully transmit and receive data, it is preferable for an eNB to inform the UE of the timing point at which the actual data is transmitted and received in the TxOP duration.

In FIG. 16, assume that the eNB manages a Pcell and/or one or more Scells. If an eNB includes Scells only, assume that the eNB is deployed to a location geographically separated from an eNB managing a Pcell. In this case, the eNBs can be connected with each other via backbone network.

FIG. 16 (a) is a diagram for explaining a method of transmitting location information on an OFDM symbol at which data is transmitted and received in a TxOP duration. Referring to FIG. 16 (a), if an eNB intends to transceive data with a UE in an SF #N, the eNB performs CS on a Scell in an SF #N-1 to check a status of the Scell [S1610].

After the CS is performed in the step S1610, the eNB transmits TxOP start information to the UE to inform the UE that a TxOP duration starts at the SF #N. In this case, the TxOP start information can be transmitted via a higher layer signal (RRC signal or MAC signal) or (E)PDCCH in a physical layer [S1620].

In the step S1620, if the TxOP start information is transmitted via the higher layer signal, the TxOP start information may indicate an index of an SF at which the TxOP duration starts. If the TxOP start information is transmitted via the (E)PDCCH, the TxOP start information may indicate that the TxOP duration starts at a subframe in which the (E)PDCCH is transmitted using a size of 1 bit. And, after the CS is performed in the step S1610, although it is determined as a channel is not in an idle state, the eNB can perform the step S1620 through PDCCH of a Pcell.

Referring back to FIG. 16, the eNB can transmit information on an OFDM symbol position (e.g., OFDM symbol index) to the UE to precisely indicate an OFDM symbol at which transmission and reception of data start in the TxOP duration. In this case, the information on the PFDM symbol can be transmitted to the UE via (E)PDCCH [S1630].

Hence, the UE is able to know that the TxOP duration starts at the SF #N via the step S1620 and may be able to know the OFDM symbol of the SF #N at which data is actually transmitted and received via the step S1630. In doing so, the eNB and/or the UE can transmit and receive data without a loss of a TxOP duration of a Scell.

According to embodiments of the present invention, the eNB can inform the UE that the TxOP duration can definitely start at the SF #N at the timing at which the SF #N-1 ends (or, the timing at which the SF #N starts). If the eNB continuously determines a channel of a Scell as a busy state until the SF #N ends, it may be able to make the TxOP duration actually start at SF #N+1 or SF #N+2. Yet, if the eNB starts CS at the SF #N-1 and informs the UE of the start of the CS at the timing at which the SF #N starts, the UE attempts to receive PDSCH from the SF #N. However, the UE can decode the buffered PDSCH only when (e)PDCCH including information on an OFDM symbol position, which indicates the timing at which TxOP actually starts, is received.

Yet, if the TxOP start information is transmitted via the higher layer signal in the step S1620, the TxOP start information can be transmitted irrespective of whether or not the step S1610 is performed. In the step S1630, the information on the OFDM symbol position is used for indicating the timing point at which the TxOP duration actually starts.

FIG. 16 (b) shows the method mentioned earlier in FIG. 16 (a) represented in a subframe unit.

Referring to FIG. 16 (b), the eNB transmits PDCCH including TxOP start information to the UE in an SF #N of a Pcell to indicate that a TxOP duration is configured in an SF #N of a Scell. The eNB can inform the UE of an OFDM symbol at which actual DL data transmission starts among 14 (or 12) OFDM symbols of the SF #N of the Scell in an SF #N+1 of the Pcell.

The UE, which has stored signals received from the start point of the SF #N, can eliminate signals of OFDM symbols not necessary in the SF #N based on information on an OFDM symbol position (i.e., a position of an OFDM symbol at which actual DL data is transmitted) received from the eNB in the SF #N+1. Hence, the UE can receive DL data included in the actually transmitted OFDM symbol only.

In FIG. 16, it may be able to utilize the resource allocation field mentioned earlier in the paragraph 4.2. For example, if a UE is configured by TDD in LTE system operating on a bandwidth of 20 MHz, 25 bits are respectively assigned to a resource allocation type 0 and a resource allocation type 1 included in a DCI format. In this case, if the eNB indicates information on an OFDM symbol position at which an actual TxOP duration starts using 4 bits instead of a resource allocation field of 25 bits, it may be able to considerably reduce overhead for transmitting control information.

Or, if a resource allocation field is replaced with information of 4 bits to support a legacy LTE/LTE-A system, zero padding can be performed on the remaining 21 bits or different control information can be included. By doing so, it is able to reduce overhead for performing BD in the UE.

The methods described in FIG. 16 can be used for a CSS scheme or an SCS (Self Carrier Scheduling) scheme. If an eNB includes two or more serving cells and operates with the CCS scheme, the step S1610 is performed in a Scell and the steps S1620 and the S1630 can be performed in a Pcell. Meanwhile, if the eNB includes two or more serving cells and operates with the SCS scheme, the steps S1610 to S1630 can be performed in the Scell. Or, the step S1610 and the step S1630 are performed in the Scell and the step S1620 can be performed in the Pcell. In this case, the Pcell corresponds to a wireless access system supporting a licensed band such as LTE/LTE-A and the like and the Scell may correspond to a wireless access system supporting an unlicensed band such as WiFi and the like.

4.3.1 Method of Configuring TxOP Duration in Consideration of CSI-RS and CSI-IM If the TxOP duration mentioned earlier in FIG. 15 (b) is configured, actual DL data transmission may not be performed on several OFDM symbols of the SF #N due to a channel state. In this case, assume a case that a CSI-RS or a CSI-IM is set to an OFDM symbol period on which DL data is not transmitted and the CSI-RS or the CSI-IM is defined as valid.

In this case, it is preferable for a UE not to measure CSI using the CSI-RS or the CSI-IM of the TxOP duration. This is because, although the TxOP duration is configured, the UE is unable to transmit and receive data in the OFDM symbol and the UE is unable to detect the CSI-RS or the CSI-IM due to a channel state.

Hence, it may be preferable that a start OFDM symbol position of an actual TxOP duration is known not only to a UE to which a resource for transmitting and receiving data is scheduled in the TxOP duration but also to all UEs belonging to the coverage of the Scell.

In this case, as mentioned earlier in the method proposed in the paragraph 4.1, the eNB can also inform all UEs belonging to the coverage of the Scell of an OFDM symbol at which actual DL data transmission starts by utilizing a CSS of a Pcell in an SF #N+1. And, if the SF #N is configured by 14 OFDM symbols (in case of extended CP, 12 symbols), the eNB can inform the UEs of the number of valid OFDM symbols among the 14 OFDM symbols.

4.4 Method of Configuring TxOP Duration of Nested Structure

In the following, methods of configuring a TxOP duration with a nested structure are explained.

A TxOP duration of a nested structure is configured by configuring a cell-specific TxOP duration and a UE-specific TxOP duration, respectively. In this case, the TxOP duration of the nested structure has a structure that the UE-specific TxOP duration belongs to the cell-specific TxOP duration.

Figure 17:
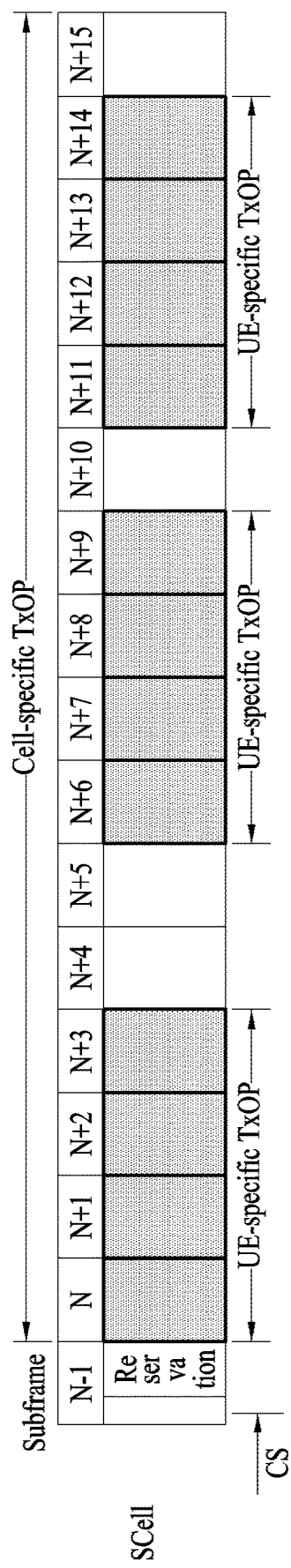
FIG. 17 is a diagram for explaining an example of a TxOP duration of a nested structure.

FIG. 17 is a diagram for explaining an example of a TxOP duration of a nested structure.

Referring to FIG. 17, assume that a cell-specific TxOP duration is configured by X SFs (e.g., 16 SFs) and a UE-specific TxOP duration is configured by Y SFs 9e.g., 4 SFs) (X≥Y). In this case, the UE-specific TxOP duration can be configured by a value common to UEs of a Scell or can be configured by a value different according to a UE. The number of SFs (X, Y) included in the cell-specific TxOP duration and the UE-specific TxOP duration can be configured by a value defined on a system in advance, a value semi-statically configured via upper layer signaling, or a value dynamically configured via physical layer signaling (e.g., (e)PDCCH, etc.). In the embodiments of the present invention, since the cell-specific TxOP duration is configured as a relatively longer duration compared to the UE-specific TxOP duration, the eNB can efficiently utilize a resource during the cell-specific TxOP duration without any additional CS.

4.4.1 DRX UE

As shown in FIG. 17, with the help of a cell-specific TxOP duration configured by a considerably long SF, a UE can perform a DRX (discontinuous reception) operation during the cell-specific TxOP duration. The DRX operation is to receive DL control signaling in an activated subframe only among subframes configured by a DRX period to reduce power consumption consumed by a reception circuit of the UE. If the UE performs the DRX operation in CA environment, all serving cells set to the UE perform the DRX operation together with the UE according to the DRX period.

In the embodiments of the present invention, assume that a Pcell operates in TDD and a DL scheduling operation of a Scell is performed via SCS rather than CCS. And, assume that a DRX UE in DRX state corresponds to a full-duplex UE capable of performing transmission and reception at the same time.

TABLE 13

<TS 36.321>

PDCCH-subframe: Refers to a subframe with PDCCH. For FDD UE operation, this represents any subframe; for TDD UE operation, if UE is capable of simultaneous reception and transmission in the aggregated cells, this represents the union of downlink subframes and subframes including DwPTS of all serving cells, except serving cells that are configured with 'schedulingCellId'; otherwise, this represents the subframes where the PCell is configured as a downlink subframe or a subframe including DwPTS.
schedulingCellId: Indicates which cell signals the downlink allocations and uplink grants, if applicable, for the concerned SCell.

As shown in Table 12, according to LTE/LTE-A TS36.321 specification, a DRX UE assumes a PDCCH monitoring subframe (e.g., used for counting onDurationTimer) as a union of DL subframes of a Pcell and DL subframes of a Scell under CA environment. However, if the Scell corresponds to an unlicensed band, whether or not the DL subframe of the Scell belonging to a TxOP duration is included in the PDCCH monitoring subframe in a UL subframe of the Pcell may become a problem.

Figure 18:
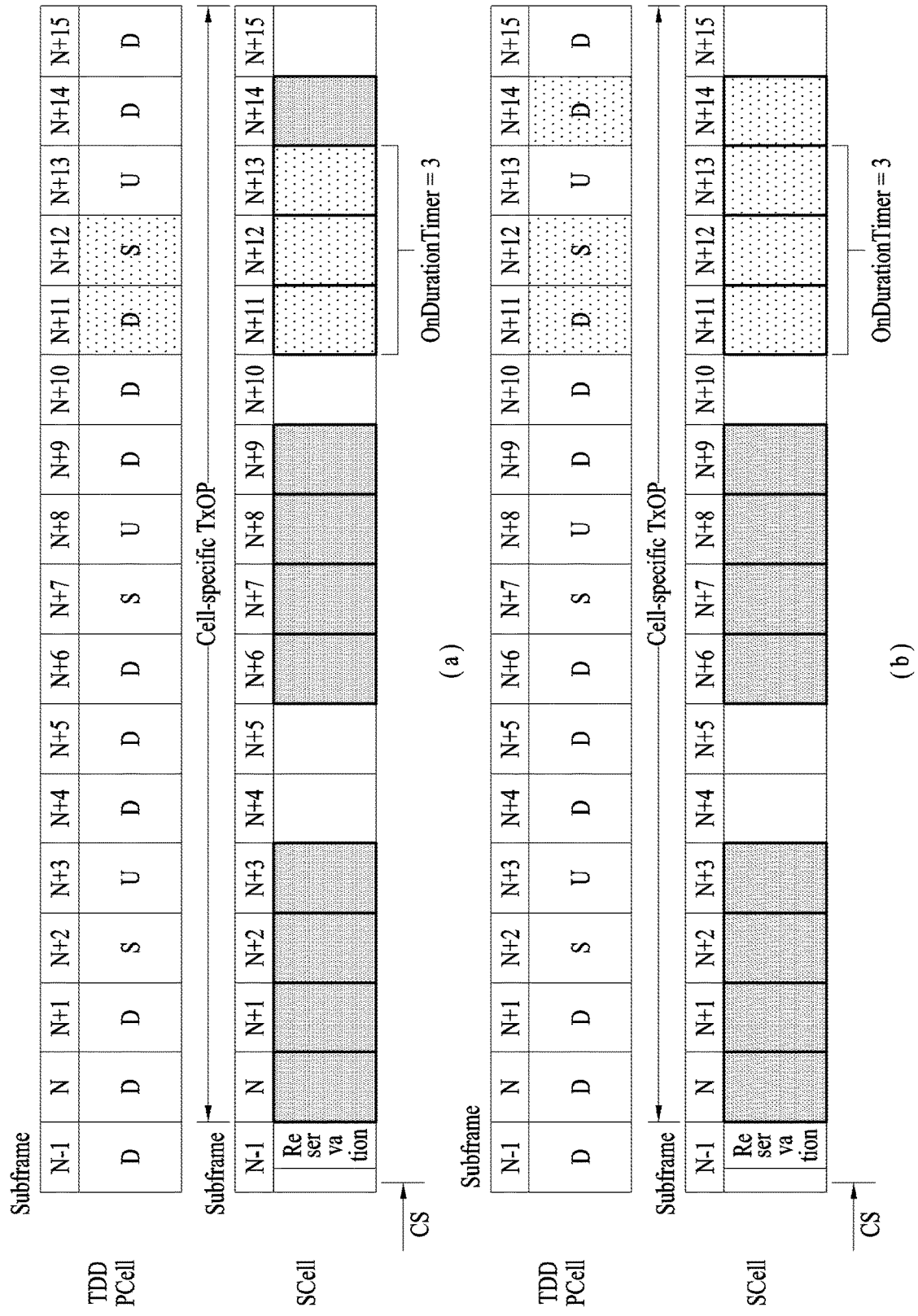
FIG. 18 is a diagram for explaining a TxOP duration of a nested structure and an operation of a DRX UE when a Pcell supports a TDD scheme.

FIG. 18 is a diagram for explaining a TxOP duration of a nested structure and an operation of a DRX UE when a Pcell supports a TDD scheme.

In the embodiment of the present invention, assume a case that a TDD Pcell uses a UL/DL configuration 2, DRX starts from an SF #N+11, and oDT (onDurationTimer) corresponds to 3. In this case, the oDT corresponds to the number of contiguous PDCCH subframes activated from the stat point of a DRX period.

Referring to FIG. 18 (a), in case of LTE/LTE-A system, on duration is maintained until an SF #N+13 of a Scell. This is because, although an SF #N+13 of a Pcell corresponds to a UL SF, the SF #N+13 of the Scell corresponds to a DL SF capable of performing self-scheduling.

However, in this case, it is not preferable to include the SF #N+13 of the Scell in the PDCCH monitoring subframe. This is because, if such a DL SF as the SF #N+13 of the Scell is used as the PDCCH monitoring SF, a specific DL SF on the Pcell belonging to active time (i.e., a DL SF on a licensed band of relatively high reliability (i.e., an SF #N+14)) is excluded by "OnDurationTimer=3". In particular, when a DRX operation is performed, a DRX period is identically operated in both the Pcell and the Scell. In this case, if oDT counting is performed on the basis of the Scell only, the number of PDCCH monitoring SFs for the Pcell is restricted by 2.

FIG. 18 (b) shows a method of configuring an SF in which oDT is not counted and a method of configuring an SF for monitoring PDCCH monitored by a DRX UE to resolve the problem mentioned earlier in FIG. 18 (a).

Although a DRX UE is able to perform self-scheduling in a Scell, it is preferable to exclude an SF belonging to a TxOP duration of the Scell corresponding to a UL SF in a TDD Pcell from a PDCCH monitoring subframe. By doing so, it is able to constantly maintain the number of DL subframes belonging to "oTD" duration of the Pcell. In this case, although an SF #N+13 of the Scell corresponds to a DL SF, "oDT" can be maintained until an SF N+14 without including the SF #N+13 of the Scell in the "oDT".

In particular, referring to FIG. 18 (b), although the Scell is configured by self-carrier scheduling scheme, SFs (e.g., DL SF and/or special SF) except a UL SF among a type of SFs of a TDD Pcell can be configured as a PDCCH monitoring SF and an SF becoming a target of the oDT counting.

As a different method, the PDCCH monitoring SF and the SF becoming a target of the oDT counting can be configured in a manner of being separated. The PDCCH monitoring SF can be configured by SFs (e.g., DL SF and/or special SF) except UL SFs of the Pcell and the Scell existing within onDuration. In particular, referring to FIG. 18 (b), an SF #N+11, an SF #N+12, and an SF #N+14 of the Pcell and SFs #N+11 to #N+14 of the Scell may correspond to the PDCCH monitoring SF. Meanwhile, the SF becoming a target of the oDT counting can be configured by SFs (e.g., DL SF and/or special SF) except UL SF among a type of SFs of a TDD Pcell. In particular, referring to FIG. 18 (b), although an SF #N+13 of the Scell corresponds to a DL SF, "oDT" can be maintained until an SF N+14 without including the SF #N+13 of the Scell in the "oDT".

4.5 Method of Sequentially Configuring TxOP Duration

FIG. 19 is a diagram for explaining a method of sequentially configuring a TxOP duration.

Referring to FIG. 19, after an SF #N at which a TxOP #1 ends, a TxOP #2 can be sequentially configured in an SF #N+1. To this end, the timing at which the TxOP #1 ends can be configured as a previous timing of an ending boundary of the SF #N. In this case, a duration ranging from an OFDM symbol at which the TxOP #1 ends to an ODFM symbol at which the new TxOP #2 starts can be defined as a carrier sensing gap (CS gap).

When there is a restriction that a TxOP starts only at a start point of an SF boundary, if a channel is in an idle state during a CS gap or a backoff operation is finished (after a reservation signal is transmitted during the remaining CS gap), an eNB can immediately start a TxOP from the start point of an SF #N+1.

In this case, if a UE is unaware of an end point of a TxOP or a length of the TxOP in an SF (e.g., SF #N or SF #N+3) at which the TxOP ends, the UE assumes the SF (e.g., SF #N or SF #N+3) as an SF configured by the entire 1 ms, it is difficult for the UE to successfully transmit and receive data in the SF. Hence, in order to solve the problem, it is preferable for an eNB to inform the UE that the SF corresponds to an SF (partial SF) shorter than 1 ms.

FIG. 19 shows a case that the last SF of a TxOP duration is configured as a PSF. In particular, a start point of the TxOP duration is configured to be matched with a start point of an SF of a Pcell. As a different scheme, a first SF of a TxOP duration can be configured as a PSF. In this case, an end point of the TxOP can be configured to be matched with an end point of an SF of a Pcell.

FIG. 20 is a flowchart for explaining a method of transmitting and receiving control information for sequentially configuring a TxOP duration.

FIG. 20 (a) shows a case that a position and a length of a PSF (partial SF) are semi-statically changing. In this case, information on the position of the PSF can be configured by an SF index indicating an SF at which a TxOP duration ends, an SF period and/or an SF offset. And, information on the length of the PSF can be configured by the number of OFDM symbols configured as the TxOP duration in an SF at which the TxOP duration ends.

Referring to FIG. 20 (a), an eNB can transmit information on the position of the PSF and the information on the length of the PSF to a UE using a higher layer signal (e.g., RRC or MAC signal) [S2010].

FIG. 20 (b) shows a method of semi-statically configuring length information of a PSF and a method of dynamically configuring position information of the PSF.

Referring to FIG. 20 (b), the eNB can transmit a higher layer signal including the length information of the PSF to the UE [S2020].

And, the eNB can transmit position information of the PSF to the UE via PDCCH including DCI. In this case, the eNB can transmit the PDCCH to the UE on a CSS [S2040].

As a different aspect of the present invention, the position information of the PSF can be transmitted to the UE using the resource allocation field of the DCI format proposed earlier in the paragraph 4.2 in the step S2040. In particular, when the eNB transceives data with the UE using a TDM scheme, the eNB eliminates the resource allocation field from the DCI format and may be then able to transmit the position information of the PSF to the UE in a manner of including the position information in the corresponding field.

Or, the eNB can make the UE identify the position of the PSF by dividing the DCI format into a scrambling sequence, a CSR mask, and/or a search space.

Or, the eNB can make the UE identify the position of the PSF by adding a new field of 1-bit length to the DCI format.

In the step S2040, when the eNB transmits the PDCCH using the CSS, the method mentioned earlier in the paragraph 4.1 can be used.

FIG. 20 (c) shows a method of dynamically allocating the length information and the position information of the PSF.

Referring to FIG. 20 (c), the eNB can inform the UE of the position information of the PSF on the CSS using the DCI format [S2055].

In the step S2055, as mentioned earlier in the paragraph 4.2, the eNB can transmit the length information and the position information of the PSF to the UE using the resource allocation field of the DCI format.

Or, in order to represent the length information and the position information of the PSF on the DCI format, it may be able to add a new PSF field to the DCI format to utilize the PSF field. For example, the eNB configures the PSF field by 4 bits to represent the number of all OFDM symbols. Or, the eNB configures the PSF field by 2 bits and may be able to configure the number of OFDM symbols in advance according to a status of each PSF field.

For example, if the PSF field corresponds to '00', it may indicate that the length of the PSF corresponds to 7 OFDM symbols. If the PSF field corresponds to '01', it may indicate that the length of the PSF corresponds to 9 OFDM symbols, if the PSF field corresponds to '10', it may indicate that the length of the PSF corresponds to 10 OFDM symbols, and if the PSF field corresponds to '11', it may indicate that the length of the PSF corresponds to 12 OFDM symbols.

And, when the CSS is utilized, it may be able to utilize the method mentioned earlier in the paragraph 4.1. In this case, if a unit of each PSF field corresponds to 2 bits, as mentioned in the foregoing example, the number of OFDM symbols can be configured in advance according to a status of each field.

The method of transmitting and receiving the length information and the position information of the PSF and the method of configuring the status of the PSF field mentioned in FIGS. 19 and 20 can be identically applied not only to a case of configuring the PSF at the last SF of a TxOP duration but also to a case of configuring the PSF at the first SF of the TxOP.

As a different aspect of the present invention, the length of the PSF mentioned earlier in FIGS. 19 and 20 can be restricted by all or a part of lengths defined on a configuration of a special SF (SSF). In this case, a method of configuring a position of a DM-RS of the PSF and a TBS (transport block size) may follow a method of configuring a DM-RS position and a TBS, which is defined when a length of an SSF is identical to each other.

5. Apparatus

Figure 21:
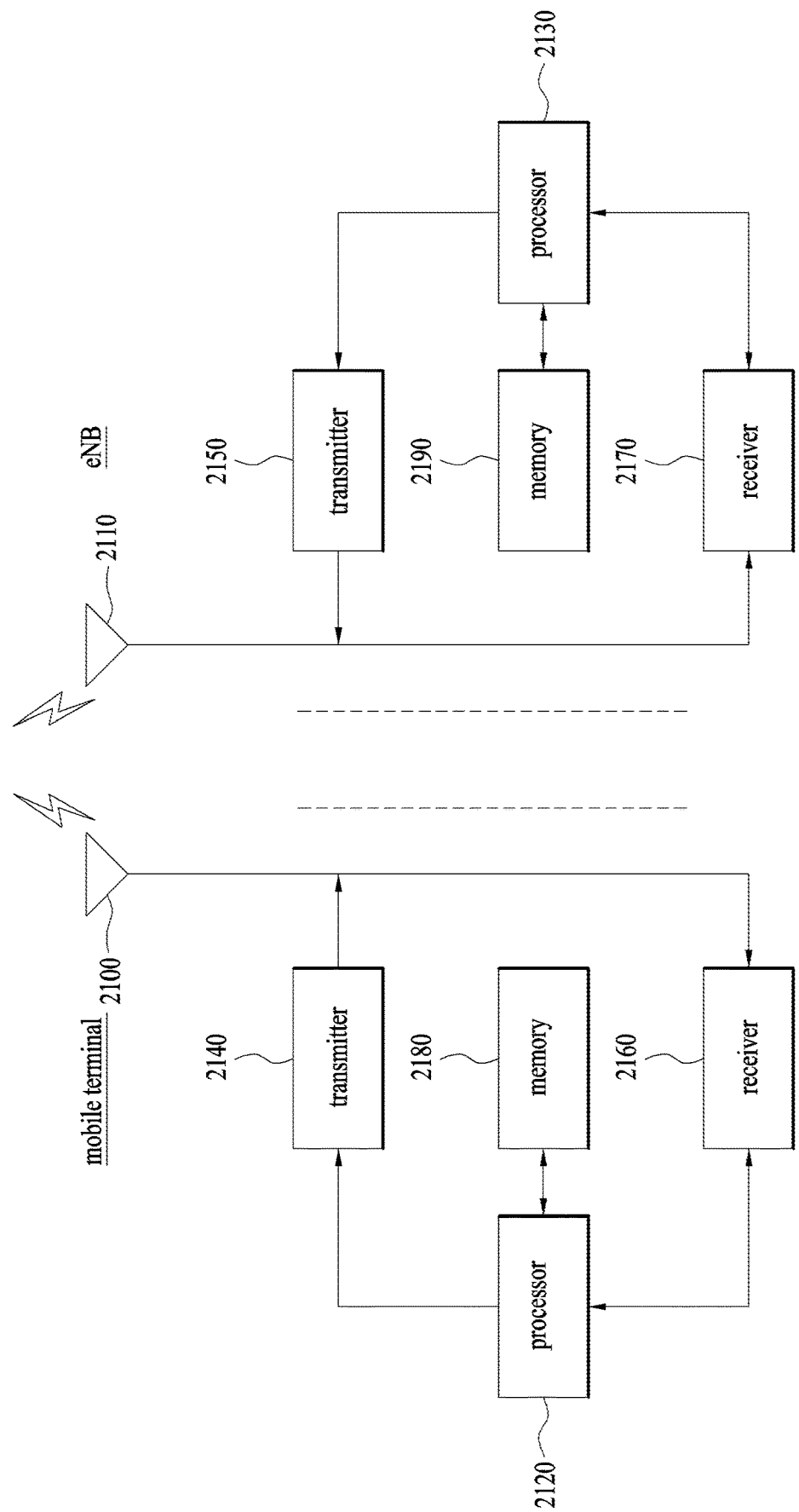
FIG. 21 is a diagram for a device capable of implementing methods mentioned earlier in FIGS. 1 to 20.

Apparatuses illustrated in FIG. 21 are means that can implement the methods described before with reference to FIGS. 1 to 20.

A UE may act as a transmitter on a UL and as a receiver on a DL. An eNB may act as a receiver on a UL and as a transmitter on a DL.

That is, each of the UE and the eNB may include a transmitter 2140 or 2150 and a receiver 2160 or 2170, for controlling transmission and reception of information, data, and/or messages, and an antenna 2100 or 2110 for transmitting and receiving information, data, and/or messages.

Each of the UE and the eNB may further include a processor 2120 or 2130 for implementing the afore-described embodiments of the present disclosure and a memory 2180 or 2190 for temporarily or permanently storing operations of the processor 2120 or 2130

The embodiments of the present invention can be performed using the configuration element and the functions of the UE and the eNB. For example, a processor of the eNB configures a TxOP duration and may be able to transmit configuration information on the TxOP duration to the UE by combining the methods disclosed in the aforementioned paragraphs 1 to 4. And, the processor of the eNB can control a transmitter and a receiver to support operations on the TxOP duration. A processor of the UE can support a TxOP duration operation based on the configuration information on the TxOP duration received from the eNB. In this case, the processor of the UE controls the transmitter and the receiver to support the TxOP operation. For details, it may refer to the paragraphs 3 and 4.

The transmitter and the receiver of the UE and the eNB may perform a packet modulation/demodulation function for data transmission, a high-speed packet channel coding function, OFDMA packet scheduling, TDD packet scheduling, and/or channelization. Each of the UE and the eNB of FIG. 21 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 2180 or 2190 and executed by the processor 2120 or 2130. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

What is claimed is:

1. A method of receiving data from a base station via an unlicensed band by a user equipment (UE) in a wireless access system supporting carrier aggregation (CA) with the unlicensed band, the method comprising:

receiving transmission opportunity (TxOP) configuration information from the base station, wherein the TxOP configuration information indicates a first TxOP duration and a second TxOP duration, the second TxOP duration is after the first TXOP duration, the first TxOP duration comprising at least one partial subframe shorter than 1 ms;

receiving orthogonal frequency division multiplexing (OFDM) start symbol position information for a start position of a data transmission within the first and second TxOP durations, wherein the start position of the data transmission is determined based on a channel state of the unlicensed band; and receiving the data via the unlicensed band during one or more subframes based on the OFDM start symbol position information and the TxOP configuration information, wherein the channel state of the unlicensed band is related with whether an idle state starts at a subframe before the one or more subframes or not, and wherein an end of the first TxOP duration equals to an end of a subframe of a primary cell (PCell) of the CA, wherein the PCell is a serving cell configured on a licensed band, and wherein a secondary cell (SCell) of the CA is a serving cell configured on the unlicensed band.

2. The method of claim 1, wherein the TxOP configuration information and the OFDM start symbol position information are transmitted via the PCell of the CA.

3. The method of claim 2, wherein the TxOP configuration information and the OFDM start symbol position information are transmitted through a different physical downlink control channel (PDCCH).

4. The method of claim 3, wherein the TxOP configuration information or the OFDM start symbol position information is transmitted through a resource allocation field of a downlink control information (DCI) format contained in the PDCCH.

5. The method of claim 2, wherein the TxOP configuration information is transmitted via a higher layer signal and wherein the OFDM start symbol position information is transmitted via a physical downlink control channel (PDCCH).

6. The method of claim 1, wherein the TxOP configuration information and the OFDM start symbol position information are transmitted via the SCell of the CA and wherein the SCell is scheduled by a self-carrier scheduling scheme.

7. The method of claim 6, wherein the TxOP configuration information and the OFDM start symbol position information are transmitted through a different physical downlink control channel (PDCCH).

8. The method of claim 6, wherein the TxOP configuration information is transmitted via a higher layer signal and wherein the OFDM start symbol position information is transmitted via a physical downlink control channel (PDCCH).

9. A user equipment (UE) for receiving data from a base station via an unlicensed band in a wireless access system supporting carrier aggregation (CA) with the unlicensed band, the UE comprising:
   a transceiver; and
   a processor configured to:
      control the transceiver to support a configuration of a first transmission opportunity (TxOP) duration and a second TxOP duration, the second TxOP duration is after the first TXOP duration, the first TxOP duration comprising at least one partial subframe shorter than 1 ms,
      control the transceiver to receive TxOP configuration information from the base station, wherein the TxOP configuration information indicates the first TxOP duration and the second TxOP duration,
      control the transceiver to receive orthogonal frequency division multiplexing (OFDM) start symbol position information for a start position of a data transmission within the first and second TxOP durations, wherein the start position of the data transmission is determined based on a channel state of the unlicensed band, and
      control the transceiver to receive the data via the unlicensed band during one or more subframes based on the OFDM start symbol position information and the TxOP configuration information,
   wherein the channel state of the unlicensed band is related with whether an idle state starts at a subframe before the one or more subframes or not, and
   wherein an end of the first TxOP duration equals to an end of a subframe of a primary cell (PCell) of the CA, wherein the PCell is a serving cell configured on a licensed band, and wherein a secondary cell (SCell) of the CA is a serving cell configured on the unlicensed band.

10. The UE of claim 9, wherein the TxOP configuration information and the OFDM start symbol position information are transmitted via the PCell of the CA.

11. The UE of claim 10, wherein the TxOP configuration information and the OFDM start symbol position information are transmitted through a different physical downlink control channel (PDCCH).

12. The UE of claim 11, wherein the TxOP configuration information or the OFDM start symbol position information is transmitted through a resource allocation field of a downlink control information (DCI) format contained in the PDCCH.

13. The UE of claim 10, wherein the TxOP configuration information is transmitted via a higher layer signal and wherein the OFDM start symbol position information is transmitted via a physical downlink control channel (PDCCH).

14. The UE of claim 9, wherein the TxOP configuration information and the OFDM start symbol position information are transmitted via the SCell of the CA and wherein the SCell is scheduled by a self-carrier scheduling scheme.

15. The UE of claim 14, wherein the TxOP configuration information and the OFDM start symbol position information are transmitted through a different physical downlink control channel (PDCCH).

16. The UE of claim 14, wherein the TxOP configuration information is transmitted via a higher layer signal and wherein the OFDM start symbol position information is transmitted via a physical downlink control channel (PDCCH).

* * * * *